United States Patent
Ly et al.

(10) Patent No.: US 12,302,251 B2
(45) Date of Patent: May 13, 2025

(54) TRP DORMANCY INDICATION OUTSIDE C-DRX ACTIVE TIME IN MTRP

(71) Applicant: QUALCOMM Incorporated, San Diego, CA (US)

(72) Inventors: Hung Dinh Ly, San Diego, CA (US); Mostafa Khoshnevisan, San Diego, CA (US); Yongjun Kwak, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 451 days.

(21) Appl. No.: 17/650,508

(22) Filed: Feb. 9, 2022

(65) Prior Publication Data

US 2023/0254770 A1  Aug. 10, 2023

(51) Int. Cl.
  *H04W 52/02* (2009.01)
  *H04W 72/0453* (2023.01)
  *H04W 72/23* (2023.01)

(52) U.S. Cl.
  CPC ... *H04W 52/0232* (2013.01); *H04W 72/0453* (2013.01); *H04W 72/23* (2023.01)

(58) Field of Classification Search
  CPC ......... H04W 52/0232; H04W 72/0453; H04W 72/23; H04W 52/0216; H04W 52/0235; Y02D 30/70
  USPC ........................................................ 370/318
  See application file for complete search history.

(56) References Cited

U.S. PATENT DOCUMENTS

| | | | | |
|---|---|---|---|---|
| 2014/0314000 | A1* | 10/2014 | Liu | H04L 5/0035 370/329 |
| 2021/0329677 | A1* | 10/2021 | Huang | H04L 1/1896 |
| 2022/0124786 | A1* | 4/2022 | Mukherjee | H04L 5/0044 |
| 2024/0080809 | A1* | 3/2024 | Matsumura | H04W 72/23 |

FOREIGN PATENT DOCUMENTS

| | | | | |
|---|---|---|---|---|
| CA | 3129746 A1 | * | 8/2020 | H04B 17/318 |
| CN | 104412524 A | * | 3/2015 | H04B 7/26 |
| WO | WO-2021093440 A1 | * | 5/2021 | H04L 5/0053 |

OTHER PUBLICATIONS

Machine English Translation of WO 2021/093440, Deng et al, "Secondary Wus Parameter Configuring Method and Apparatus, Storage Medium, Serving Base Station and Terminal", May 20, 2021 (Year: 2021).*
International Search Report and Written Opinion—PCT/US2023/012452—ISA/EPO—Jun. 6, 2023.

* cited by examiner

*Primary Examiner* — Mazda Sabouri
(74) *Attorney, Agent, or Firm* — Procopio, Cory, Hargreaves & Savitch LLP

(57) ABSTRACT

Method and apparatus for a dormancy indication outside of a discontinuous reception (DRX) active time. The apparatus receives a wake up signal (WUS) outside of a DRX on duration. The WUS comprises an indication indicating one or more parameters associated with a cell within a group of cells to be active during a DRX active time that corresponds to the WUS. The one or more parameters comprising at least one of a transmission configuration indicator (TCI) state or a control resource set (CORESET) index. The apparatus monitors for at least one physical downlink control channel (PDCCH) from at least one active cell during the DRX active time using active parameters according to the WUS.

25 Claims, 16 Drawing Sheets

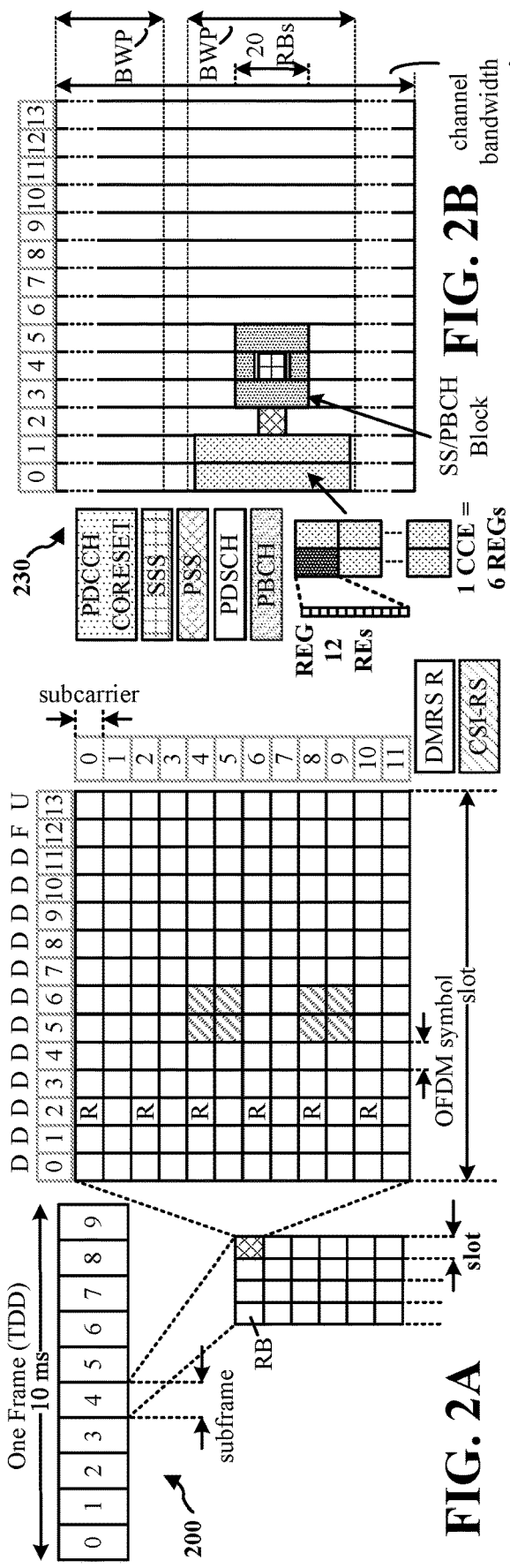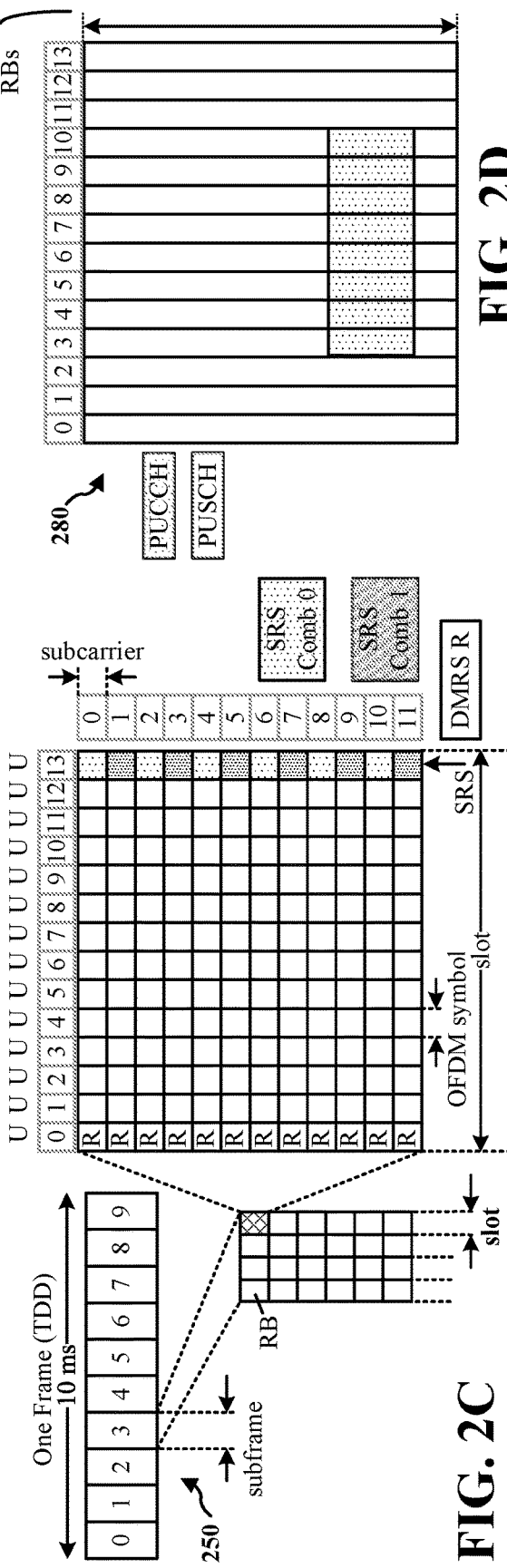
FIG. 2A
FIG. 2B
FIG. 2C
FIG. 2D

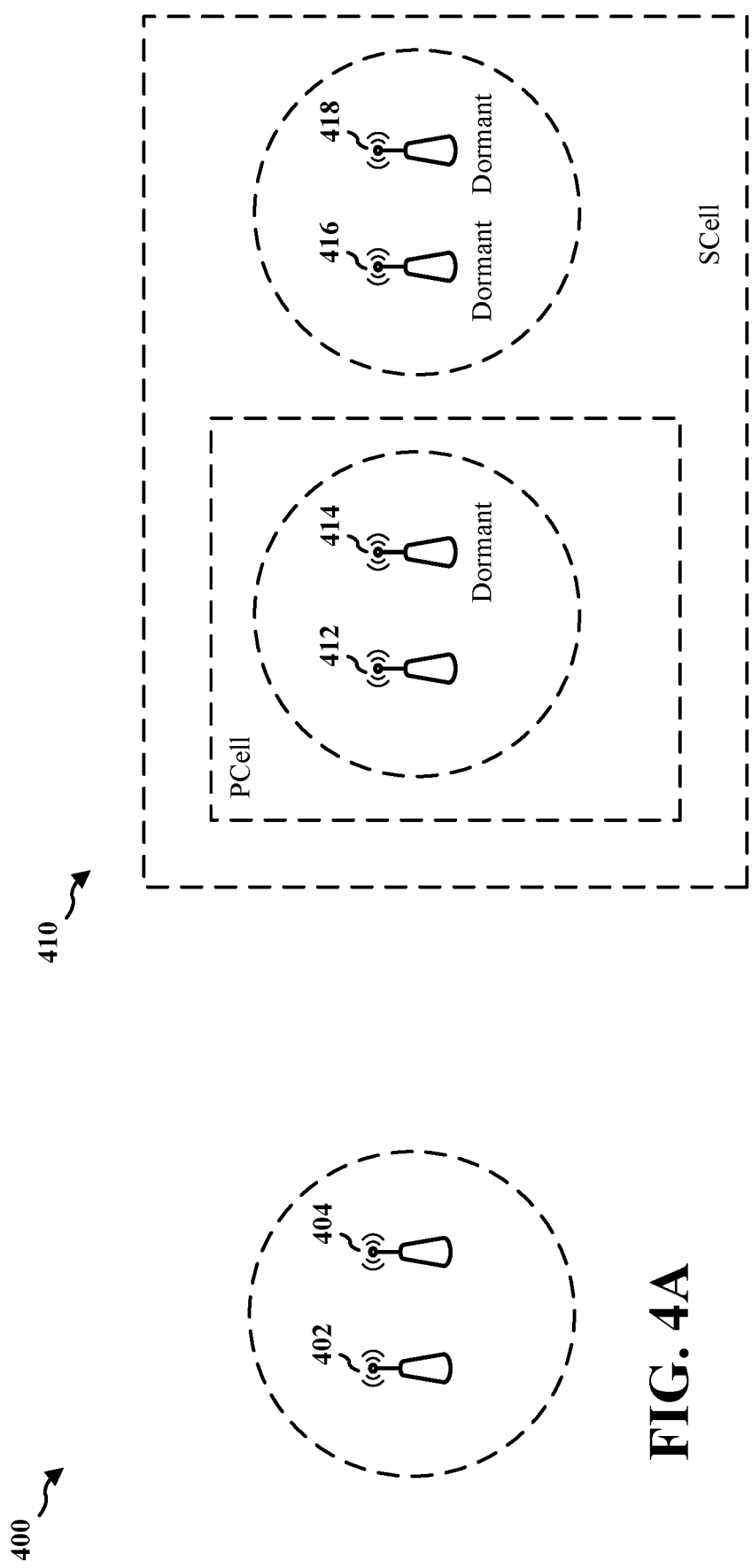

TRP DORMANCY INDICATION OUTSIDE C-DRX ACTIVE TIME IN MTRP

TECHNICAL FIELD

The present disclosure relates generally to communication systems, and more particularly, to a dormancy indication outside of a discontinuous reception (DRX) active time.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a device at a UE. The device may be a processor and/or a modem at a UE or the UE itself. The apparatus receives a wake up signal (WUS) outside of a discontinuous reception (DRX) on duration. The WUS comprising an indication indicating one or more parameters associated with a cell within a group of cells to be active during a DRX active time that corresponds to the WUS. The one or more parameters comprising at least one of a transmission configuration indicator (TCI) state or a control resource set (CORESET) index. The apparatus monitors for at least one physical downlink control channel (PDCCH) from at least one active cell during the DRX active time using active parameters according to the WUS.

In an aspect of the disclosure, a method, a computer-readable medium, and an apparatus are provided. The apparatus may be a device at a base station. The device may be a processor and/or a modem at a base station or the base station itself. The apparatus configures a wake up signal (WUS) for transmission outside of a discontinuous reception (DRX) on duration. The WUS comprising an indication indicating one or more parameters associated with a cell within a group of cells to be active during a DRX active time that corresponds to the WUS. The one or more parameters comprising at least one of a transmission configuration indicator (TCI) state or a control resource set (CORESET) index. The apparatus transmits, to at least one UE, the WUS outside of the DRX on duration.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

FIGS. 4A-4B are diagrams illustrating examples of mTRP configurations.

DETAILED DESCRIPTION

Figure 1:
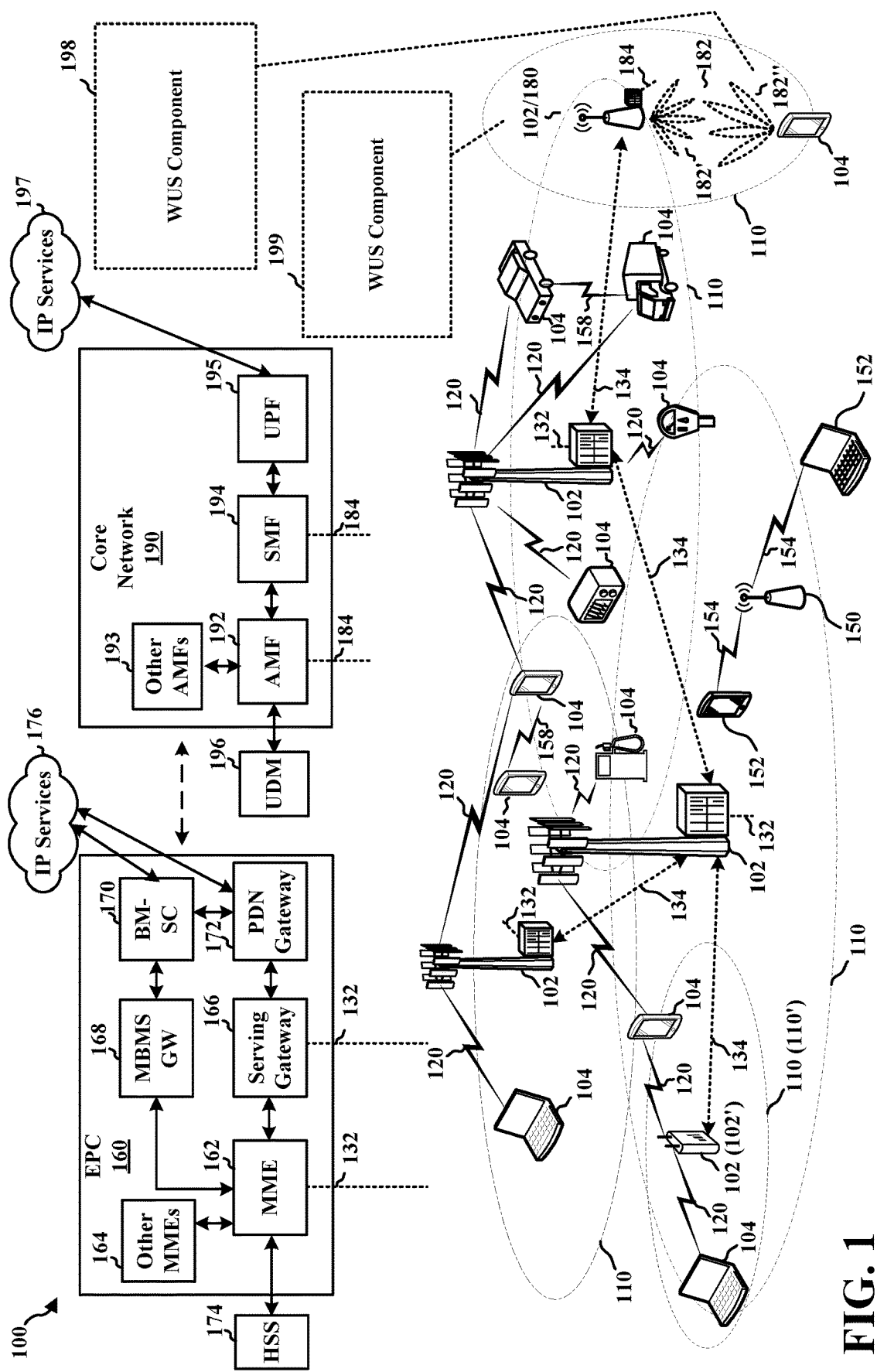
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells. As described herein, a network node, which may be referred to as a node, a network node, a communication node, or a wireless node, may be implemented as a base station (e.g., an aggregated base station), a disaggregated base station, an integrated access and backhaul (IAB) node, a relay node, a sidelink node, etc., or the like. The network node may be any base station described herein.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may be configured to allow a UE to receive a dormancy indication outside of a DRX on duration. For example, the UE 104 may comprise a WUS component 198 configured to allow a UE to receive a dormancy indication outside of a DRX on duration. The UE 104 may receive a WUS outside of a DRX on duration. The WUS may comprise an indication indicating one or more parameters associated with a cell within a group of cells to be active during a DRX active time that corresponds to the WUS. The one or more parameters comprising at least one of a TCI state or a CORESET index. The UE 104 may monitor for at least one PDCCH from at least one active cell during the DRX active time using active parameters according to the WUS.

Referring again to FIG. 1, in certain aspects, the base station 180 may be configured to configure and provide a dormancy indication to at least one UE outside of a DRX on duration. For example, the base station 180 may comprise a WUS component 199 configured to configure and provide a dormancy indication to at least one UE outside of a DRX on duration. The base station 180 may configure a WUS for transmission outside of a DRX on duration. The WUS may comprise an indication indicating one or more parameters associated with a cell within a group of cells to be active during a DRX active time that corresponds to the WUS. The one or more parameters comprising at least one of a TCI state or a CORESET index. The base station 180 may transmit, to at least one UE, the WUS outside of the DRX on duration.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^{\mu*15}$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
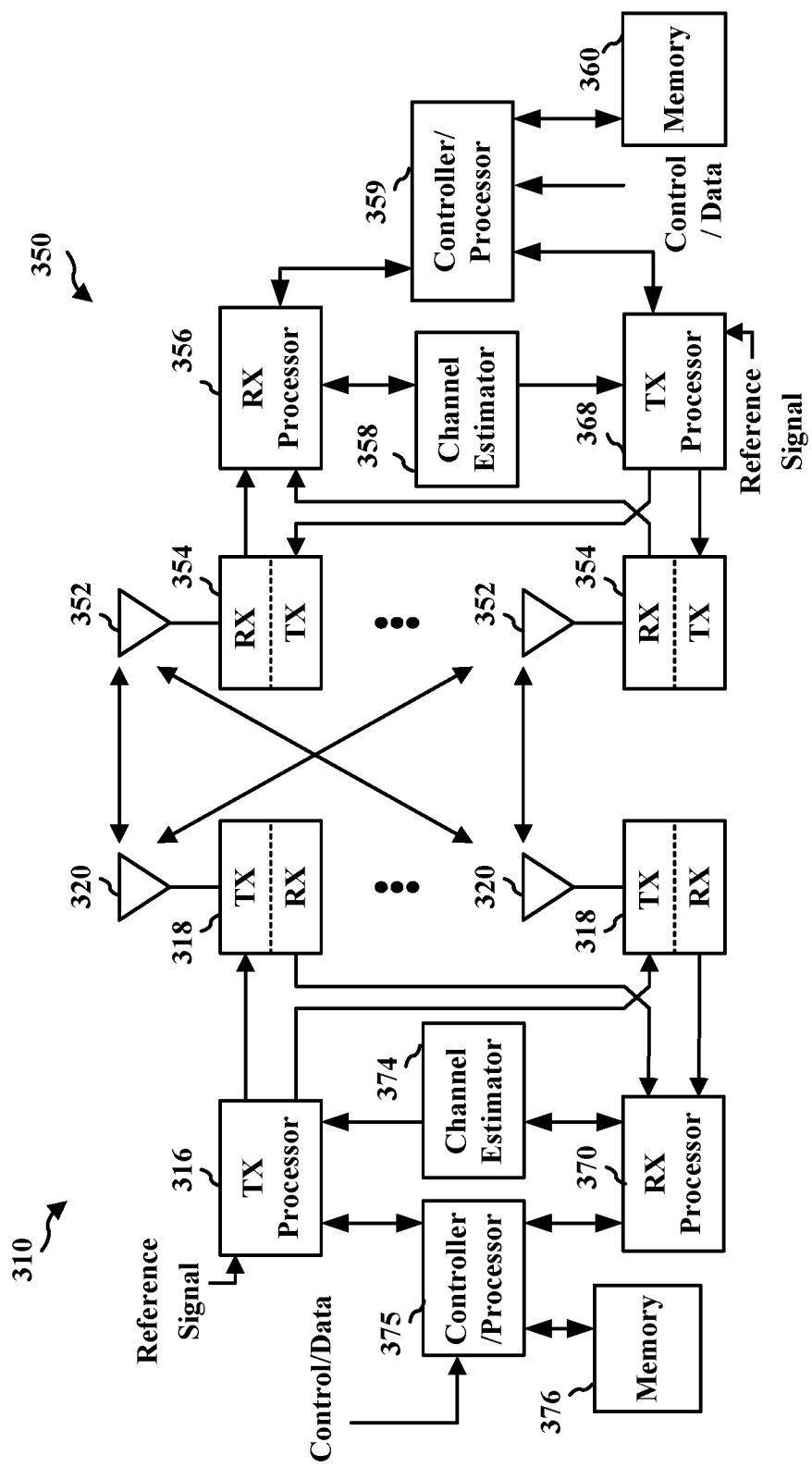
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

In wireless communications, there has been a growing concern over the power consumed by wireless communication networks due to environmental factors such as carbon emissions. The power consumption of wireless communication networks may constitute a significant portion of wireless network operators operating expenses. For example, wireless communication networks (e.g., 5G networks) power consumption may be impacted or influenced due to larger bandwidths being utilized and/or an increased number of antennas and of bands. As such, network energy efficiency may become increasingly important such that wireless network operators may look for network power saving solutions that may optimize or reduce power consumption at wireless communication networks.

In some instances, wireless networks, such as 5G massive multiple input multiple output (mMIMO), may provide for increased throughput and improved latency, but may do so at the expense of power consumption and may face a significant increase in their operating expenses due to the increase in power consumption. In some instances, a 5G network utilizing adaptive antenna units (AAU) may utilize more than twice the amount of power in comparison to a 4G network using remote radio units (RRU). For example, for the 5G network and the 4G network with 0% loading, the 5G network may utilize 2.4 times the amount of power that the 4G network utilizes. In instances where both the 5G network and the 4G network have a load of 50%, the 5G network may utilize 2.6 times the amount of power that the 4G network utilizes. In yet another example, where both the 5G network and the 4G network have a load of 100%, the 5G network may utilize 3 times the amount of power that the 4G network utilizes. As such, energy consumption for mMIMO with AAUs in 5G networks demand a significant amount of power for operation.

A number of techniques have been developed that may assist in power consumption, such as, transmission reception point (TRP) dormancy. In instances where there are multiple TRPs (e.g., 402, 404), such as in diagram 400 of FIG. 4A, in normal operation there may be a high loading on a base station and multiple TRPs associated with the base station. In instances where there is a reduced or low loading on the base station and there are one or more TRPs (e.g., 412, 414, 416, 418), such as in diagram 410 of FIG. 4B, then one or more of the TRP or physical transmission point may be turned off or may enter a dormant state. For example, the TRP 414 within the primary cell (PCell) may enter a dormant state. In some instances, a secondary cell (SCell) may comprise one or more TRPs 416, 418, and the one or more of the TRPs may enter the dormant state in response to a low or reduced load on the system. The base station may provide an indication to the UE to indicate which of the TRPs will be in a dormant state. TRP dormancy may be utilized to dynamically transition one or more TRPs into a dormant state for multiple TRP (mTRP) or distributed MIMO (D-MIMO).

Figure 5A:
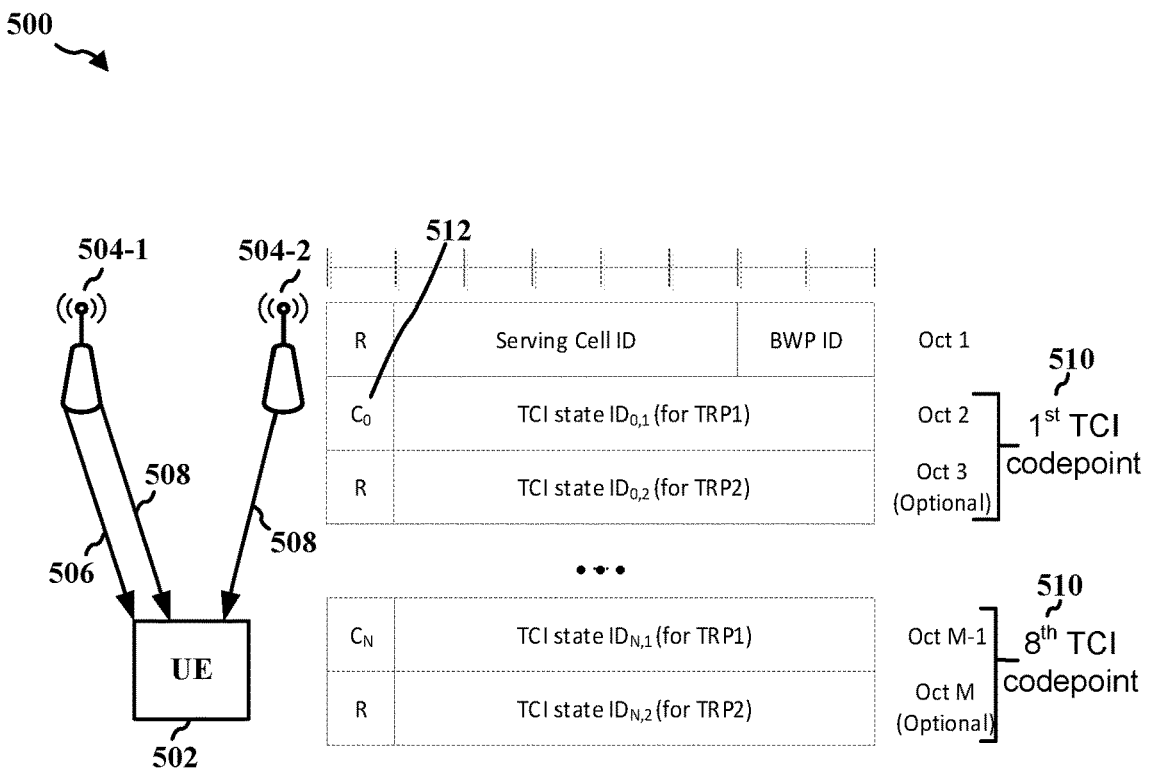
FIG. 5A is a diagram illustrating an example of a single DCI configuration.

A TRP may be present in two scenarios, in a single DCI (sDCI) scenario and a multi DCI (mDCI) scenario. In the sDCI scenario, for example as shown in diagram 500 of FIG. 5A, a first TRP 504-1 may transmit a PDCCH 506 that includes a DCI may schedule a PDSCH 508 from multiple TRPs (e.g., TRP 504-1, 504-2) to a UE 502. In the grant for the PDSCH 508 carried in the PDCCH 506, is going to include information related to a TCI state. In instances where there is only one TRP, then there will only be one TCI state. In instances where there are two TRPs, then there will be two TCI states. The DCI may comprise a TCI field (e.g., TCI codepoint 510). The TCI field may indicate the TCI state based on the number of TRPs. For example, in instances where there is only one TRP, then the TCI field (e.g., TCI codepoint 510) will indicate only one TCI state, but in instances where there are two TRPs, then the TCI field will indicate two TCI states, where each of the two TCI states corresponds to a respective one of the two TRPs. The DCI may indicate whether multiple TRPs are configured, for example at Co 512. If the UE is configured with two TCI states, for a DCI codepoint, then the UE will receive the PDSCH based on the two TCI states. As such, with reference to FIG. 5A, the UE 502 may be configured with two TCI states such that the UE 502 will receive the PDSCH 508 from TRP 504-1 and TRP 504-2. If the UE 502 is configured with one TCI state, then the UE 502 may only receive the PDSCH 508 from that configured TCI state. The TCI state may provide the UE with a quasi-colocated (QCL) source. The QCL source may correspond to a reference signal (e.g., SSB, CSI-RS). When the UE receives the PDSCH, the UE may utilize the reference signal to perform channel estimation and to determine the direction in which the UE is to receive the PDSCH. In some instances, the network may switch dynamically between sTRP and mTRP based on the interpretation of the TCI field. However, switching between sTRP and mTRP based on the TCI field may not be triggered without data (e.g., PDSCH) being scheduled.

Figure 5B:
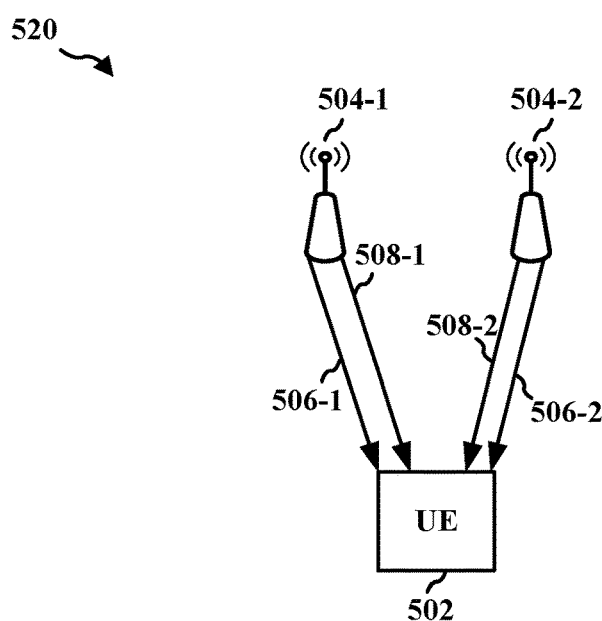
FIG. 5B is a diagram illustrating an example of a multi-DCI configuration.

FIG. 5B is a diagram 520 of the mDCI scenario. In the mDCI scenario, the UE 502 may receive multiple PDSCHs, where each PDSCH will be scheduled by a corresponding DCI in the PDCCH. For example, the UE may receive a PDCCH 506-1 from TRP 504-1, where the DCI in the PDCCH 506-1 will schedule the PDSCH 508-1. The UE may also receive a PDCCH 506-2 from TRP 504-2, where the DCI in the PDCCH 506-2 will schedule the PDSCH 508-2. The UE may determine whether it needs to receive one or more PDSCHs based on a CORESET pool index. For example, if the UE is configured with two CORESET pool indices, then the UE may receive two PDSCH (e.g., 508-1, 508-2). If the UE is configured with only one CORESET pool index, then the UE may only receive one PDSCH. The TRP (e.g., 504-1 or 504-2) may correspond to a corresponding CORSET pool index, such that the UE receives the PDSCH based on the CORESET pool index. In some instances, the network may switch dynamically between sTRP and mTRP based on BWP switching. However, switching between sTRP and mTRP based on the BWP switching may not be triggered without data (e.g., PDSCH) being scheduled.

Aspects presented herein provide a configuration for an enhanced dormancy indication that may be received outside of a DRX on duration. The enhanced dormancy indication may comprise an explicit TRP dormancy indication. In some instances, the enhanced dormancy indication may jointly indicate TRP dormancy and SCell dormancy. In some instances, the SCell dormancy may be extended to at least one TRP in a PCell. At least one advantage of the disclosure is that the enhanced dormancy indication may provide the network with a power savings with a small signaling overhead. At least another advantage of the disclosure is that the enhanced dormancy indication may allow for jointly indicating the TRP dormancy and the SCell dormancy. The enhanced dormancy indication may allow for a power reduction at the UE by reducing the PDCCH monitoring for dormant TRP, as well as a power reduction at base stations, which may reduce operating expenses for the network operators.

Figure 6:
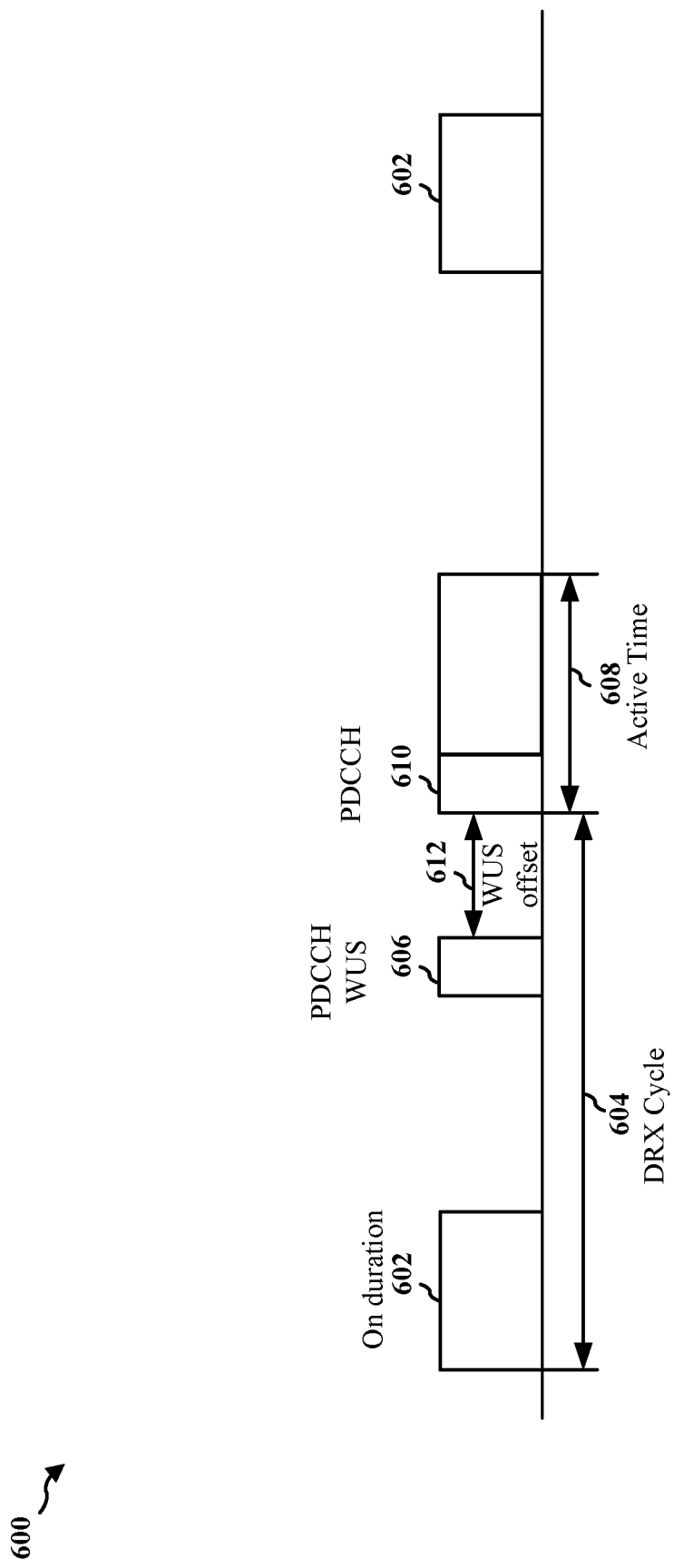
FIG. 6 is a diagram illustrating an example of a DRX operation.

FIG. 6 is a diagram 600 of a DRX operation. The DRX operation may comprise a DRX on duration 602 within a DRX cycle 604. The duration of the DRX cycle 604 that does not include the DRX on duration 602 may be a DRX off portion. In some instances, the UE may receive a WUS 606 during the DRX off portion. The WUS 606 may be comprised within a PDCCH. A DCI within the PDCCH may instruct the UE to monitor for a PDCCH 610 in a scheduled or upcoming DRX on duration. The UE may monitor for the PDCCH 610 during the active time 608, such that the UE is scheduled to wake up at the scheduled DRX on duration that corresponds to the WUS 606. The scheduled DRX on duration that corresponds to the WUS 606 may be active for an active time 608. The duration of the active time 608 may be provided within PDCCH 610. The receipt of the WUS 606 during the DRX off duration and the start of the active time 608 may be offset by a WUS offset 612. The UE may monitor and receive a PDCCH 610 during the active time 608.

Figure 7:
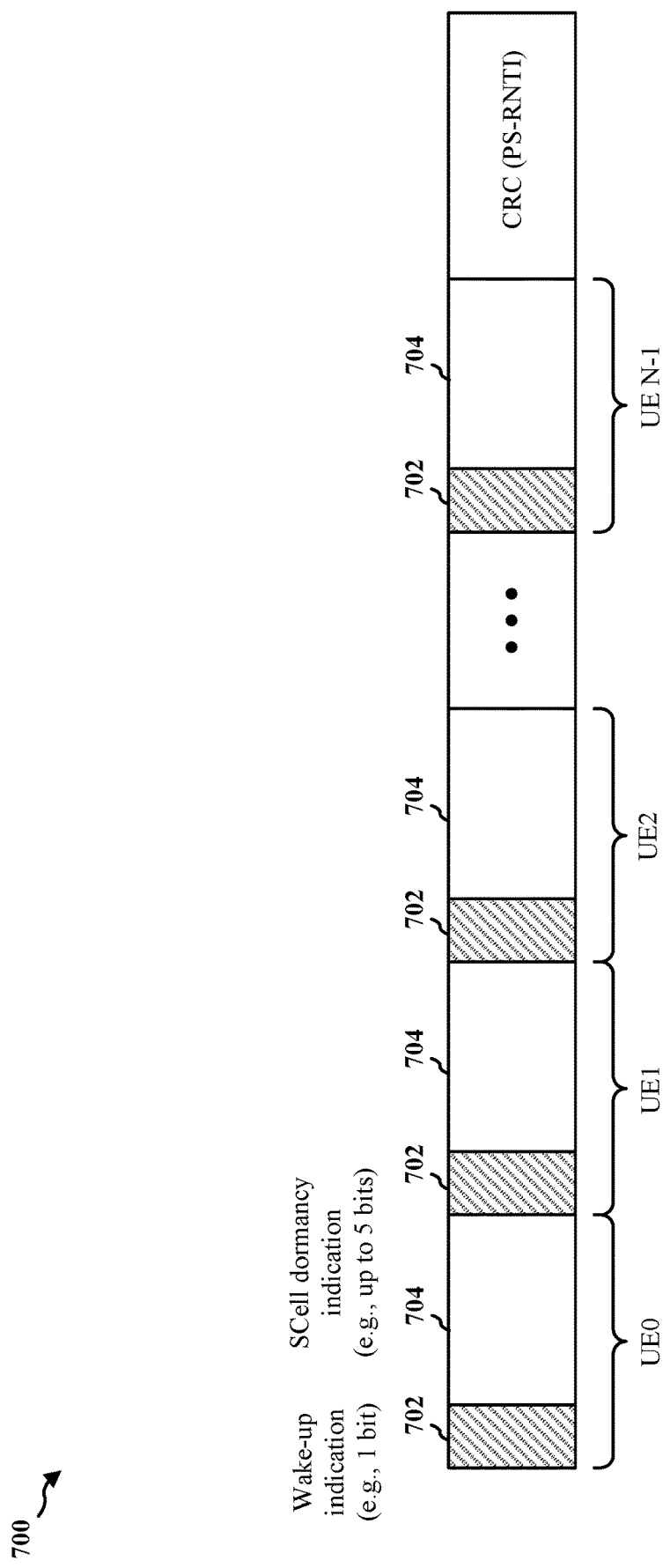
FIG. 7 is a diagram illustrating an example of a WUS.

FIG. 7 is a diagram 700 of the WUS. The WUS may be for a group of UEs, where each UE may have two types of information a wake-up indication 702 and an SCell dormancy indication 704. The wake-up indication 702 may comprise 1 bit, where the bit may indicate whether the UE should monitor or not. The SCell dormancy indication 704, which may comprise up to 5 bits, may indicate which cell group of the SCell will be in a dormant state, such that the UE does not monitor for any data for such cell group of the SCell. Each of the bits of SCell dormancy indication 704 may correspond to a cell group of the SCell, such that the SCell dormancy indication 704 may correspond to up to five cell groups. So if a group is set to be in the dormancy state, then all the SCells within the group will be in the dormant state. In some instances, the WUS may be sent from a PCell, and the WUS may indicate the dormancy state of the SCell.

SCell dormancy may occur if the UE moves from a non-dormant BWP to a dormant BWP. In instances where the UE has data to transmit or receive in active state, then the UE may be within a non-dormant BWP. However, if the UE does not have any data to transmit or receive, then the network may instruct the UE to enter a dormant state by moving from the non-dormant BWP to a dormant BWP. The UE may transition to the non-dormant BWP from the dormant BWP if the UE has some activity (e.g., transmit or receive data). The BWP switching between the dormant BWP and the non-dormant BWP may be utilized as a dormancy indication.

Figure 8:
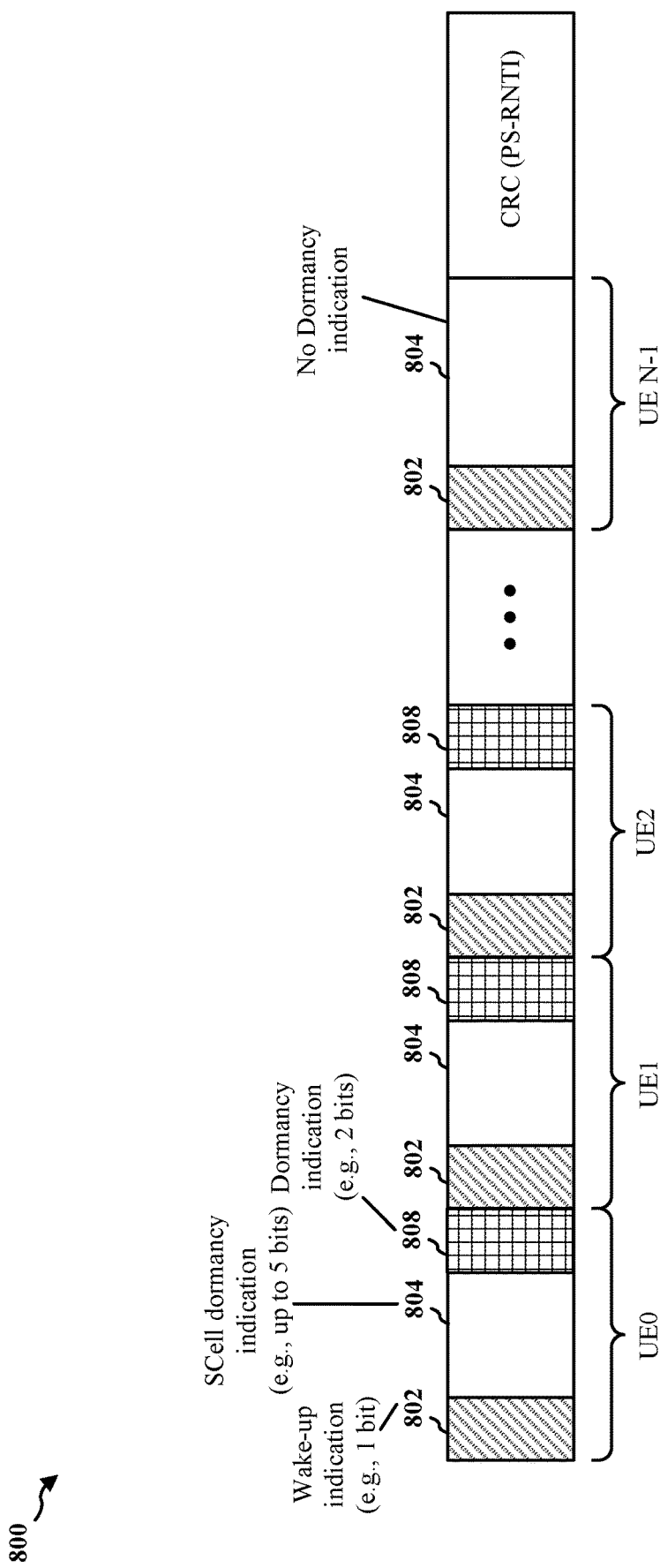
FIG. 8 is a diagram illustrating an example of an enhanced WUS.

FIG. 8 is a diagram 800 of an enhanced WUS. The enhanced WUS may be for a group of UEs, where each UE may have multiple types of information. For example, the enhanced WUS may include a wake-up indication 802, an SCell dormancy indication 804, and a dormancy indication 808. The wake-up indication 802 may comprise 1 bit, where the bit may indicate whether the UE should monitor or not. The SCell dormancy indication 804, which may comprise up to 5 bits, may indicate which cell group of the SCell will be in a dormant state, such that the UE does not monitor for any data for such cell group of the SCell. In some instances, the dormancy indication 808, may comprise 2 bits, where the bits may indicate active parameters for each active cell or for a set of active cells. In some aspects, the active parameters may correspond to at least a plurality of TCI states or a plurality of CORESET indices. In some aspects, the SCell dormancy indication 804 may comprise the active parameters for a set of cells. For example, the WUS shown in diagram 800 that corresponds to UE N-1 may only comprise the wake-up indication 802 and the SCell dormancy indication 804, where the SCell dormancy indication 804 comprises the active parameters for a set of cells. The UE N-1 may be a different type of UE (e.g., legacy UE, reduced capacity UE) than any of UE0, UE1, or UE2 such that the UE N-1 supports less services that that of UE0, UE1, or UE2. In such instances, the enhanced WUS may have a portion that does not include the dormancy indication 808 to be backwards compatible with UEs that support less services than other UEs that may utilize the parameters indicated within dormancy indication 808.

Figure 9:
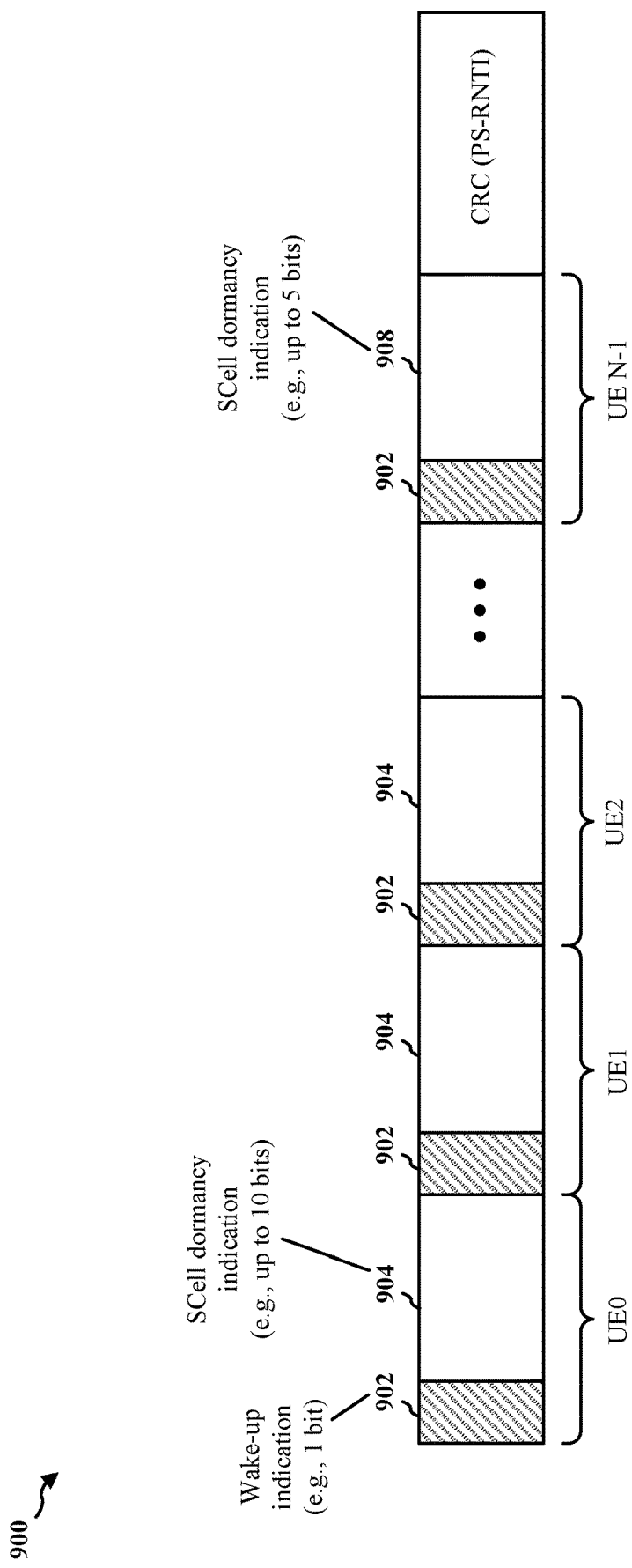
FIG. 9 is a diagram illustrating an example of an enhanced WUS.

In some aspects, for example in diagram 900 of FIG. 9, the enhanced WUS may comprise a wake-up indication 902, an SCell dormancy indication 904, and an SCell dormancy indication 908. The SCell dormancy indication 904 of the enhanced WUS may comprise one or more bits to indicate the active parameters for a set of cells, such that the SCell dormancy is extended for a SCell group to two bits. The SCell dormancy indication 904 may be comprised of up to 10 bits. Each group may be identified by a set of two bits, such that the two bits may indicate which cell group of the SCell will be in a dormant state. In some aspects, the active parameters may correspond to at least a plurality of TCI states or a plurality of CORESET indices. The enhanced WUS in the example of FIG. 9 may include an SCell dormancy indication 908 that may be comprised of up to 5 bits. The SCell dormancy indication 908 may comprise the active parameters for a set of cells. For example, the enhanced WUS of FIG. 9 that corresponds to UE N-1 may only comprise the wake-up indication 902 and the SCell dormancy indication 908, where the SCell dormancy indication 908 comprises the active parameters for a set of cells. The UE N-1 may be a different type of UE (e.g., legacy UE, reduced capacity UE) than any of UE0, UE1, or UE2 such that the UE N-1 supports less services that that of UE0, UE1, or UE2. In such instances, the enhanced WUS may have a portion that does not include the SCell dormancy indication 904 of up to 10 bits to be backwards compatible with UEs that support less services than other UEs that may utilize the parameters indicated within SCell dormancy indication 904.

In some instances, TRPs across component carriers (CC) may or may not be the same, such that a first CC and a second CC may both be configured with a CORESET pool index of 0 or 1, while a third CC may be configured with a CORESET pool index of 0. In such instances a first TRP and a second TRP may be in the first CC, while a third TRP and a fourth TRP may be in the second CC, and a fifth TRP may be in the third CC. In such instances, dormancy may be defined based on a group for all cells. For example, each bit of the SCell dormancy indication may correspond to a group of cells, such that the interpretation of the DCI within the WUS is different. The one bit in DCI that indicates whether the group is dormant or not, while the grouping of the cells may be within one CC, across multiple CCs, or both. The one or more parameters associated with the cell within the group of cells may be associated with different carriers. In some instances, the indication indicating the one or more parameters associated with the cell may identify a subset of dormant cells within the group of cells. The subset of cells within the group of cells may be associated with at least one of a CC or multiple CCs.

In some instances, dormancy may be defined based on the group of cells or based on the active parameters associated with the TCI state or the CORESET index. For example, the base station may provide the UE with an indication that indicates that the subset of dormant cells are within the group of cells or based on the active parameters associated with the TCI state or the CORESET index. In some aspects, the base station may provide the indication via RRC signaling.

In some instances, a PCell may be configured as part of an SCell group or a TRP group for enabling a PCell dormancy indication. In such instances, at least one TRP of the PCell must remain active in order to allow the PCell to perform control signaling, otherwise the PCell will be inaccessible. One or more cells of the PCell may be configured as being part of the group of cells. The one or more parameters of the PCell may be identified as dormant based on the WUS.

In some aspects, the UE may monitor for PDCCHs associated with an active TRP in mTRP. For example, the UE may be configured with two CORESET pool indices in mDCI and the dormancy indication indicates that a first TCI state is dormant while a second TCI state is active. In such instances, the UE may monitor for PDCCH for the second TCI state that is active. At least one PDCCH may be monitored with an active parameter within the group of cells of the PCell.

Figure 10:
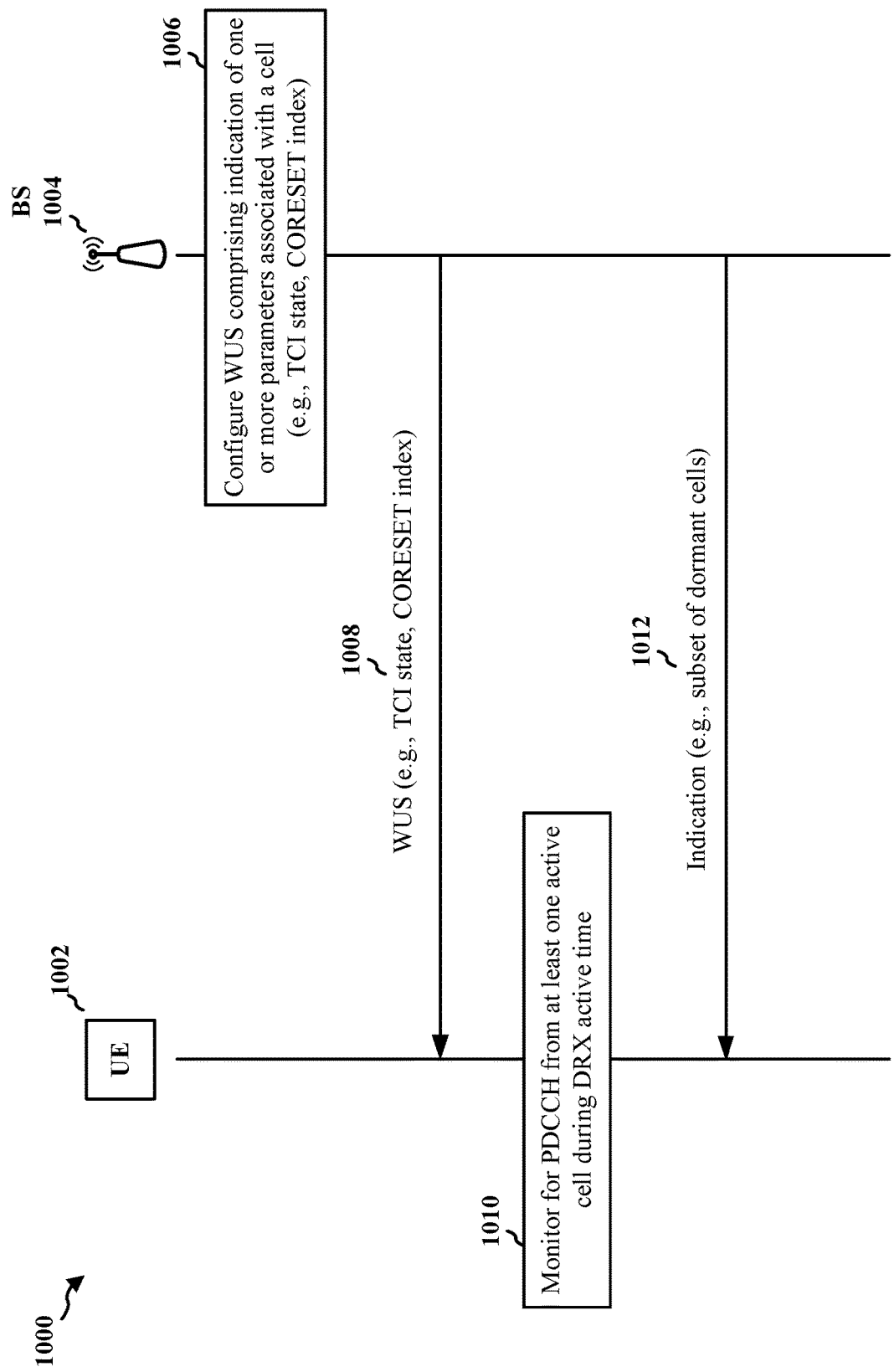
FIG. 10 is a call flow diagram of signaling between a UE and a base station.

FIG. 10 is a call flow diagram 1000 of signaling between a UE 1002 and a base station 1004. The base station 1004 may be configured to provide at least one cell. The UE 1002 may be configured to communicate with the base station 1004. For example, in the context of FIG. 1, the base station 1004 may correspond to base station 102/180 and, accordingly, the cell may include a geographic coverage area 110 in which communication coverage is provided and/or small cell 102' having a coverage area 110'. Further, a UE 1002 may correspond to at least UE 104. In another example, in the context of FIG. 3, the base station 1004 may correspond to base station 310 and the UE 1002 may correspond to UE 350.

As illustrated at 1006, the base station 1004 may configure a WUS comprising an indication indicating one or more parameters associated with a cell within a group of cells. The WUS may be configured for transmission outside of a DRX on duration. The one or more parameters may indicate the cell within the group of cells to be active during a DRX active time that corresponds to the WUS. The one or more parameters may comprise at least one of a TCI state or a CORESET index. In some aspects, the one or more parameters may comprise the TCI state in a sDCI based on a mTRP configuration. In some aspects, the one or more parameters may comprise the CORESET index in mDCI based on the mTRP configuration. In some aspects, the WUS may comprise an SCell dormancy field and a dormancy field. The SCell dormancy field and the dormancy field may indicate the active parameters for each active cell or for a set of active cells. The dormancy field may be comprised of a plurality of bits. The SCell dormancy field may be comprised of a plurality of bits. The plurality of bits of the dormancy field may correspond to at least one of a plurality of TCI states or a plurality of CORESET indices. In some aspects, the WUS may comprise an SCell dormancy field, where the SCell dormancy field comprises more than one bit to indicate the active parameters for a set of cells. In some aspects, one or more cells of a PCell may be configured as part of the group of cells. One or more active parameters of the PCell may be identified as dormant based on the WUS. In such instances, at least one parameter of the PCell remains active, such that the PCell comprises at least one active cell.

As illustrated at 1008, the base station 1004 may transmit the WUS to the UE 1002. The base station 1004 may transmit the WUS outside of the DRX on duration. The UE 1002 may receive the WUS from the base station 1004 outside of the DRX on duration. In some aspects, at least one PDCCH may be transmitted to the UE 1002 by an active parameter with the group of cells.

As illustrated at 1010, the UE 1002 may monitor for at least one PDCCH. The UE may monitor for at least one PDCCH from at least one active cell during the DRX active time. The UE may monitor for the at least one PDCCH from the at least one active cell during the DRX active time using active parameters according to the WUS. In some aspects, the at least one PDCCH may be monitored with an active parameter with the group of cells.

As illustrated at 1012, the base station 1004 may transmit an indication indicating a subset of dormant cells. The base station may transmit the indication indicating the subset of dormant cells to the UE 1002. In some aspects, the base station may transmit the indication indicating the subset of the dormant cells to at least one UE. The UE 1002 may receive the indication indicating the subset of the dormant cells from the base station 1004. The subset of dormant cells may be within a group of cells or based on the active parameters associated with the TCI state or the CORSET index. In some aspects, the one or more parameters associated with the cell within the group of cells may be associated with different component carriers. The indication indicating the one or more parameters associated with the cell may identify the subset of dormant cells within the group of cells. The subset of dormant cells within the group of cells may be associated with at least one of a component carrier or multiple component carriers.

Figure 11:
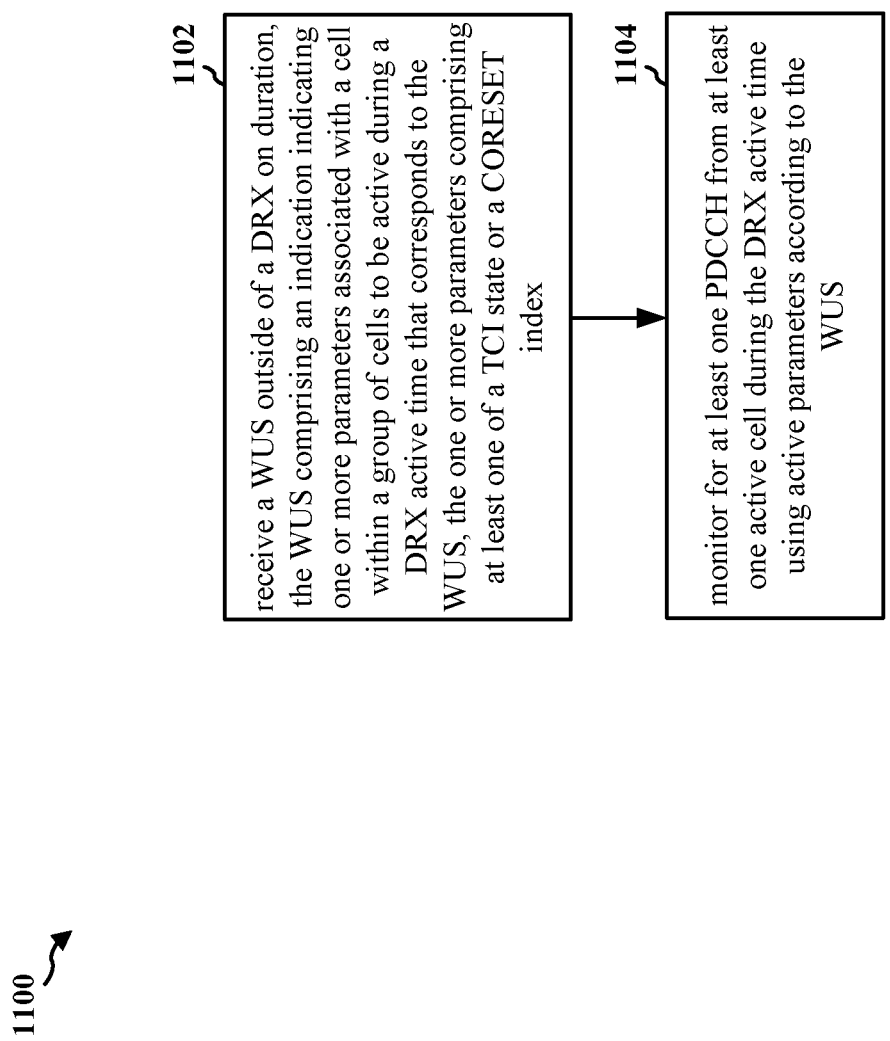
FIG. 11 is a flowchart of a method of wireless communication.

FIG. 11 is a flowchart 1100 of a method of wireless communication. The method may be performed by a UE (e.g., the UE 104; the apparatus 1302). One or more of the illustrated operations may be omitted, transposed, or contemporaneous. The method may allow a UE to receive a dormancy indication outside of a DRX on duration.

At 1102, the UE may receive a WUS outside of a DRX on duration. For example, 1102 may be performed by WUS component 1340 of apparatus 1302. The WUS may comprise an indication indicating one or more parameters associated with a cell within a group of cells. The one or more parameters may indicate the cell within the group of cells to be active during a DRX active time that corresponds to the WUS. The one or more parameters may comprise at least one of a TCI state or a CORESET index. In some aspects, the one or more parameters may comprise the TCI state in a sDCI based on a mTRP configuration. In some aspects, the one or more parameters may comprise the CORESET index in mDCI based on the mTRP configuration. In some aspects, the WUS may comprise an SCell dormancy field and a dormancy field. The SCell dormancy field and the dormancy field may indicate the active parameters for each active cell or for a set of active cells. The dormancy field may be comprised of a plurality of bits. The SCell dormancy field may be comprised of a plurality of bits. The plurality of bits of the dormancy field may correspond to at least one of a plurality of TCI states or a plurality of CORESET indices. In some aspects, the WUS may comprise an SCell dormancy field, where the SCell dormancy field comprises more than one bit to indicate the active parameters for a set of cells. In some aspects, the one or more parameters associated with the cell within the group of cells may be associated with different component carriers. The indication indicating the one or more parameters associated with the cell may identify a subset of dormant cells within the group of cells. The subset of dormant cells within the group of cells may be associated with at least one of a component carrier or multiple component carriers. In some aspects, one or more cells of a PCell may be configured as part of the group of cells. One or more active parameters of the PCell may be identified as dormant based on the WUS. In such instances, at least one parameter of the PCell remains active, such that the PCell comprises at least one active cell.

At 1104, the UE may monitor for at least one PDCCH. For example, 1104 may be performed by monitor component 1342 of apparatus 1302. The UE may monitor for at least one PDCCH from at least one active cell during the DRX active time. The UE may monitor for the at least one PDCCH from the at least one active cell during the DRX active time using active parameters according to the WUS. In some aspects, the at least one PDCCH may be monitored with an active parameter with the group of cells.

Figure 12:
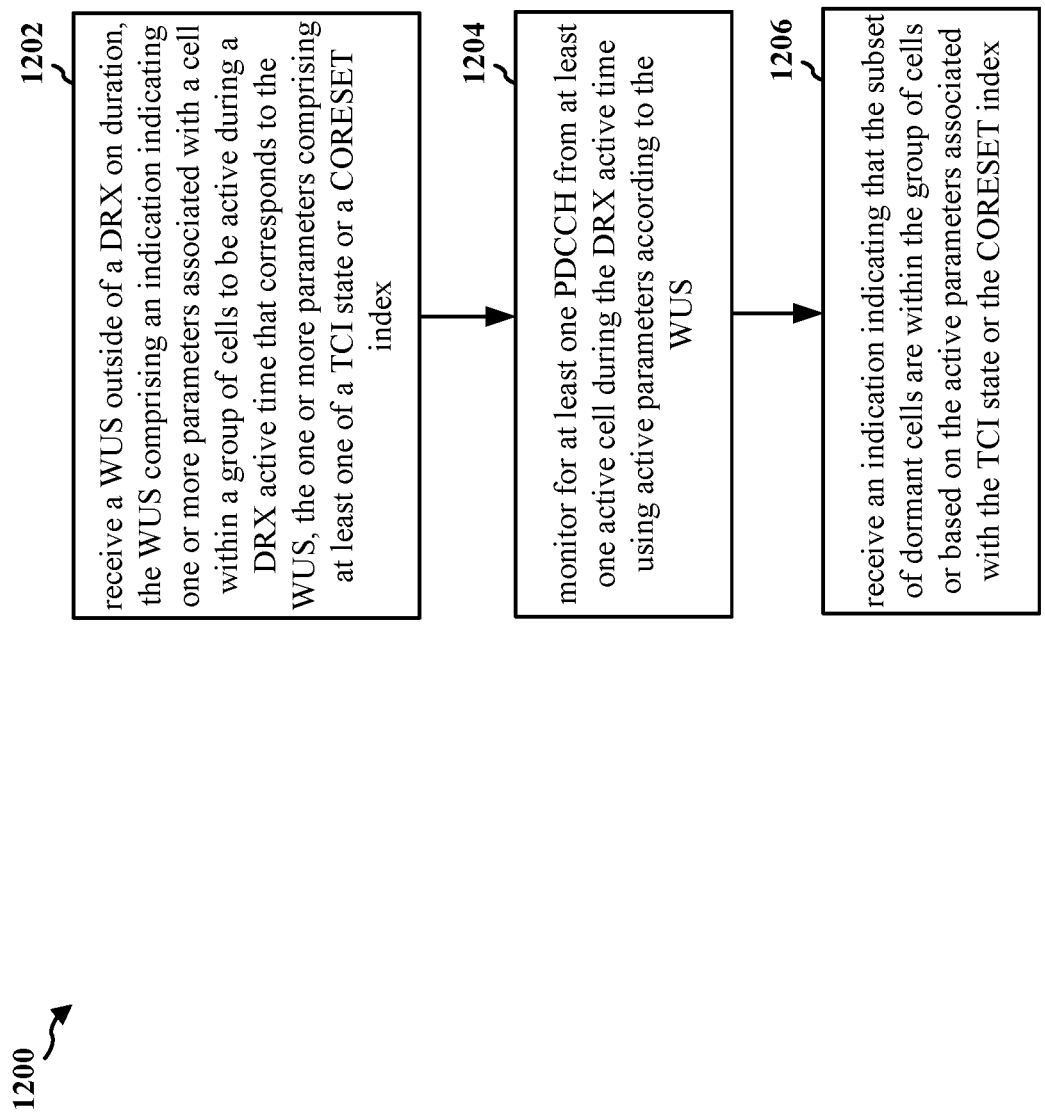
FIG. 12 is a flowchart of a method of wireless communication.

FIG. 12 is a flowchart 1200 of a method of wireless communication. The method may be performed by a UE (e.g., the UE 104; the apparatus 1302). One or more of the illustrated operations may be omitted, transposed, or contemporaneous. The method may allow a UE to receive a dormancy indication outside of a DRX on duration.

At 1202, the UE may receive a WUS outside of a DRX on duration. For example, 1202 may be performed by WUS component 1340 of apparatus 1302. The WUS may comprise an indication indicating one or more parameters associated with a cell within a group of cells. The one or more parameters may indicate the cell within the group of cells to be active during a DRX active time that corresponds to the WUS. The one or more parameters may comprise at least one of a TCI state or a CORESET index. In some aspects, the one or more parameters may comprise the TCI state in a sDCI based on a mTRP configuration. In some aspects, the one or more parameters may comprise the CORESET index in mDCI based on the mTRP configuration. In some aspects, the WUS may comprise an SCell dormancy field and a dormancy field. The SCell dormancy field and the dormancy field may indicate the active parameters for each active cell or for a set of active cells. The dormancy field may be comprised of a plurality of bits. The SCell dormancy field may be comprised of a plurality of bits. The plurality of bits of the dormancy field may correspond to at least one of a plurality of TCI states or a plurality of CORESET indices. In some aspects, the WUS may comprise an SCell dormancy field, where the SCell dormancy field comprises more than one bit to indicate the active parameters for a set of cells. In some aspects, one or more cells of a PCell may be configured as part of the group of cells. One or more active parameters of the PCell may be identified as dormant based on the WUS. In such instances, at least one parameter of the PCell remains active, such that the PCell comprises at least one active cell.

At 1204, the UE may monitor for at least one PDCCH. For example, 1204 may be performed by monitor component 1342 of apparatus 1302. The UE may monitor for at least one PDCCH from at least one active cell during the DRX active time. The UE may monitor for the at least one PDCCH from the at least one active cell during the DRX active time using active parameters according to the WUS. In some aspects, the at least one PDCCH may be monitored with an active parameter with the group of cells.

At 1206, the UE may receive an indication indicating a subset of dormant cells. For example, 1206 may be performed by indication component 1344 of apparatus 1302. The subset of dormant cells may be within a group of cells or based on the active parameters associated with the TCI state or the CORSET index. In some aspects, the one or more parameters associated with the cell within the group of cells may be associated with different component carriers. The indication indicating the one or more parameters associated with the cell may identify the subset of dormant cells within the group of cells. The subset of dormant cells within the group of cells may be associated with at least one of a component carrier or multiple component carriers.

Figure 13:
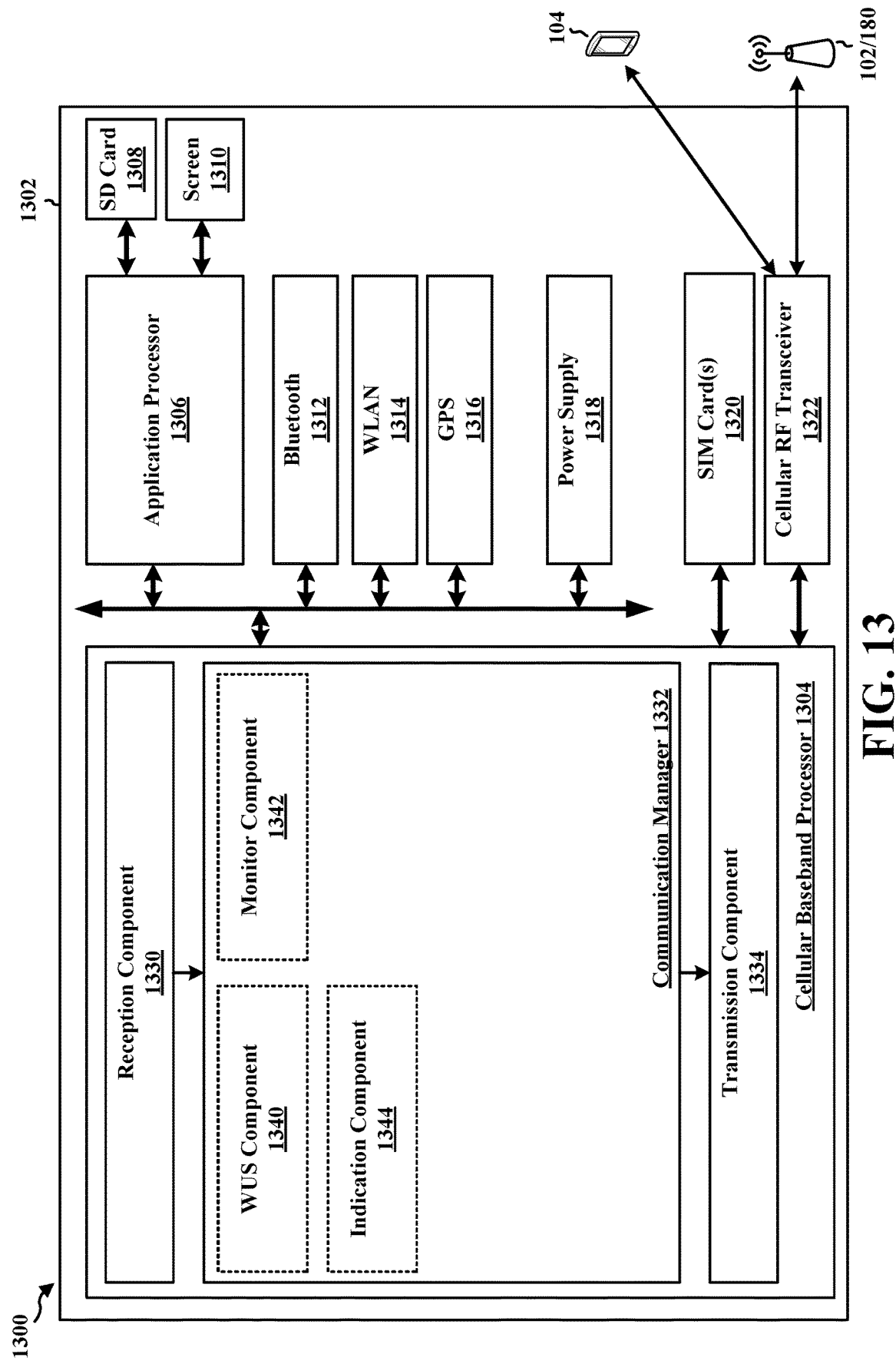
FIG. 13 is a diagram illustrating an example of a hardware implementation for an example apparatus.

FIG. 13 is a diagram 1300 illustrating an example of a hardware implementation for an apparatus 1302. The apparatus 1302 may be a UE, a component of a UE, or may implement UE functionality. In some aspects, the apparatus 1302 may include a cellular baseband processor 1304 (also referred to as a modem) coupled to a cellular RF transceiver 1322. In some aspects, the apparatus 1302 may further include one or more subscriber identity modules (SIM) cards 1320, an application processor 1306 coupled to a secure digital (SD) card 1308 and a screen 1310, a Bluetooth module 1312, a wireless local area network (WLAN) module 1314, a Global Positioning System (GPS) module 1316, or a power supply 1318. The cellular baseband processor 1304 communicates through the cellular RF transceiver 1322 with the UE 104 and/or BS 102/180. The cellular baseband processor 1304 may include a computer-readable medium/memory. The computer-readable medium/memory may be non-transitory. The cellular baseband processor 1304 is responsible for general processing, including the execution of software stored on the computer-readable medium/memory. The software, when executed by the cellular baseband processor 1304, causes the cellular baseband processor 1304 to perform the various functions described supra. The computer-readable medium/memory may also be used for storing data that is manipulated by the cellular baseband processor 1304 when executing software. The cellular baseband processor 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the cellular baseband processor 1304. The cellular baseband processor 1304 may be a component of the UE 350 and may include the memory 360 and/or at least one of the TX processor 368, the RX processor 356, and the controller/processor 359. In one configuration, the apparatus 1302 may be a modem chip and include just the baseband processor 1304, and in another configuration, the apparatus 1302 may be the entire UE (e.g., see 350 of FIG. 3) and include the additional modules of the apparatus 1302.

The communication manager 1332 includes a WUS component 1340 that is configured to receive a WUS outside of a DRX on duration, e.g., as described in connection with 1102 of FIG. 11 or 1202 of FIG. 12. The communication manager 1332 further includes a monitor component 1342 that is configured to monitor for at least one PDCCH, e.g., as described in connection with 1104 of FIG. 11 or 1204 of FIG. 12. The communication manager 1332 further includes an indication component 1344 that is configured to receive an indication indicating a subset of dormant cells, e.g., as described in connection with 1206 of FIG. 12.

The apparatus may include additional components that perform each of the blocks of the algorithm in the flowcharts of FIGS. 11 and 12. As such, each block in the flowcharts of FIGS. 11 and 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1302 may include a variety of components configured for various functions. In one configuration, the apparatus 1302, and in particular the cellular baseband processor 1304, includes means for receiving a WUS outside of a DRX on duration. The WUS comprising an indication indicating one or more parameters associated with a cell within a group of cells to be active during a DRX active time that corresponds to the WUS. The one or more parameters comprising at least one of a TCI state or a CORESET index. The apparatus includes means for monitoring for at least one PDCCH from at least one active cell during the DRX active time using active parameters according to the WUS. The apparatus further includes means for receiving an indication indicating that the subset of dormant cells are within the group of cells or based on the active parameters associated with the TCI state or the CORESET index. The means may be one or more of the components of the apparatus 1302 configured to perform the functions recited by the means. As described supra, the apparatus 1302 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 14:
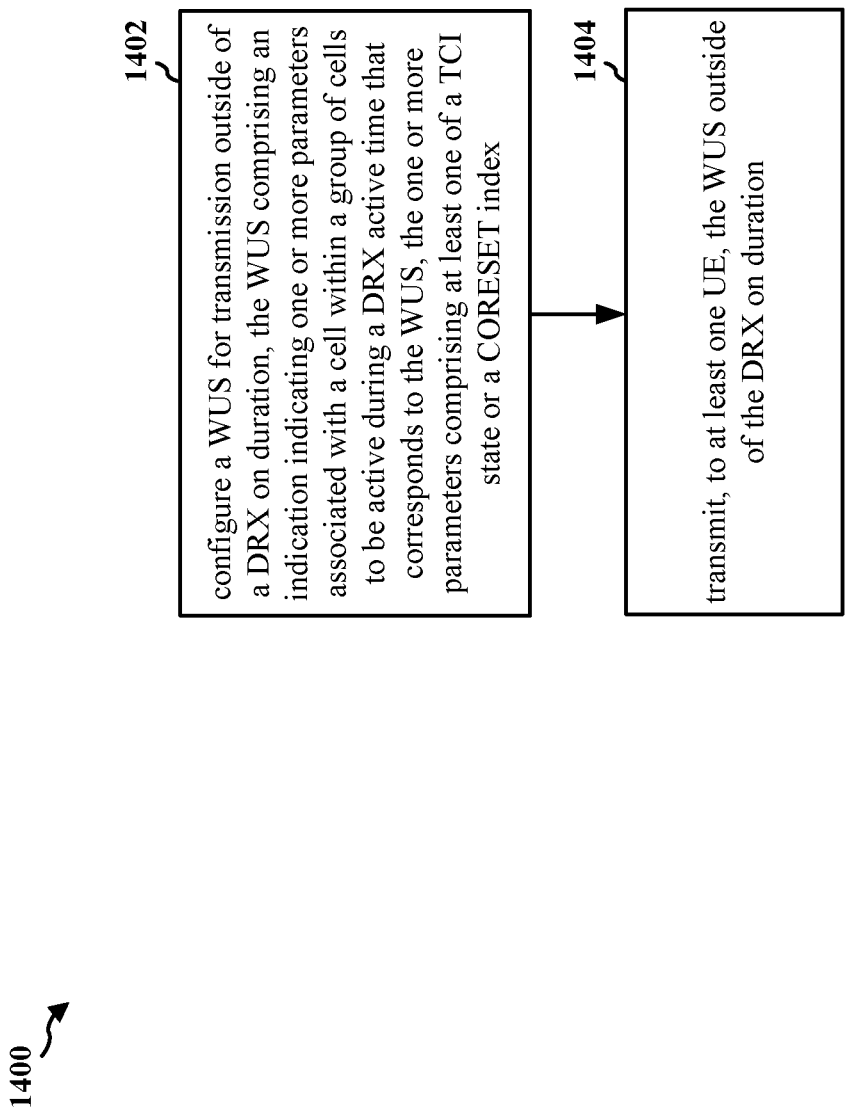
FIG. 14 is a flowchart of a method of wireless communication.

FIG. 14 is a flowchart 1400 of a method of wireless communication. The method may be performed by a base station (e.g., the base station 102/180; the apparatus 1602). One or more of the illustrated operations may be omitted, transposed, or contemporaneous. The method may allow a base station to configure and provide a dormancy indication to at least one UE outside of a DRX on duration.

At 1402, the base station may configure a WUS for transmission outside of a DRX on duration. For example, 1402 may be performed by WUS component 1640 of apparatus 1602. The WUS may comprise an indication indicating one or more parameters associated with a cell within a group of cells. The one or more parameters may indicate the cell within the group of cells to be active during a DRX active time that corresponds to the WUS. The one or more parameters may comprise at least one of a TCI state or a CORESET index. In some aspects, the one or more parameters may comprise the TCI state in a sDCI based on a mTRP configuration. In some aspects, the one or more parameters may comprise the CORESET index in mDCI based on the mTRP configuration. In some aspects, the WUS may comprise an SCell dormancy field and a dormancy field. The SCell dormancy field and the dormancy field may indicate the active parameters for each active cell or for a set of active cells. The dormancy field may be comprised of a plurality of bits. The SCell dormancy field may be comprised of a plurality of bits. The plurality of bits of the dormancy field may correspond to at least one of a plurality of TCI states or a plurality of CORESET indices. In some aspects, the WUS may comprise an SCell dormancy field, where the SCell dormancy field comprises more than one bit to indicate the active parameters for a set of cells. In some aspects, one or more cells of a PCell may be configured as part of the group of cells. One or more active parameters of the PCell may be identified as dormant based on the WUS. In such instances, at least one parameter of the PCell remains active, such that the PCell comprises at least one active cell.

At 1404, the base station may transmit the WUS outside of the DRX on duration. For example, 1404 may be performed by WUS component 1640 of apparatus 1602. The base station may transmit the WUS outside of the DRX on duration to at least one UE. In some aspects, at least one PDCCH may be transmitted by an active parameter with the group of cells.

Figure 15:
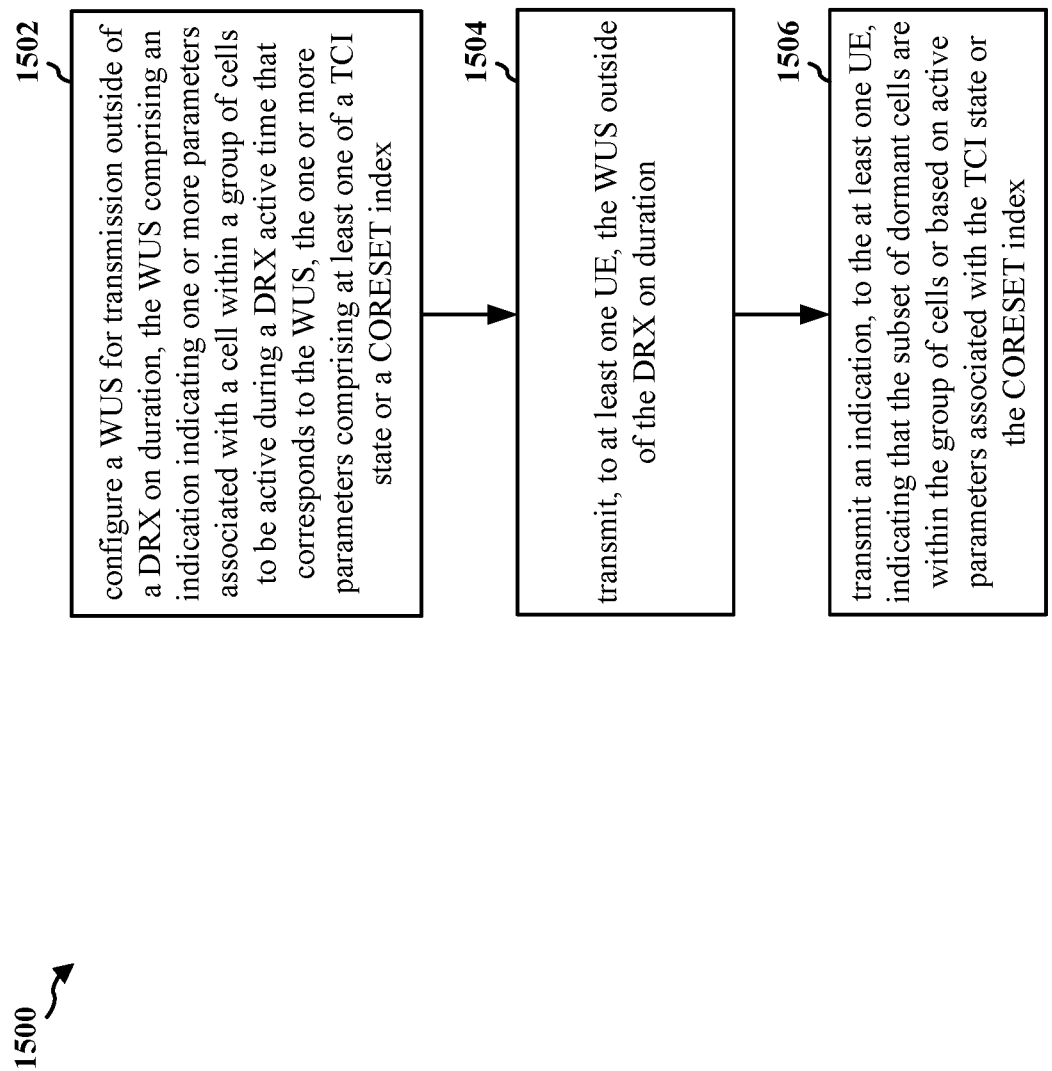
FIG. 15 is a flowchart of a method of wireless communication.

FIG. 15 is a flowchart 1500 of a method of wireless communication. The method may be performed by a base station (e.g., the base station 102/180; the apparatus 1602). One or more of the illustrated operations may be omitted, transposed, or contemporaneous. The method may allow a base station to configure and provide a dormancy indication to at least one UE outside of a DRX on duration.

At 1502, the base station may configure a WUS for transmission outside of a DRX on duration. For example, 1502 may be performed by WUS component 1640 of apparatus 1602. The WUS may comprise an indication indicating one or more parameters associated with a cell within a group of cells. The one or more parameters may indicate the cell within the group of cells to be active during a DRX active time that corresponds to the WUS. The one or more parameters may comprise at least one of a TCI state or a CORESET index. In some aspects, the one or more parameters may comprise the TCI state in a sDCI based on a mTRP configuration. In some aspects, the one or more parameters may comprise the CORESET index in mDCI based on the mTRP configuration. In some aspects, the WUS may comprise an SCell dormancy field and a dormancy field. The SCell dormancy field and the dormancy field may indicate the active parameters for each active cell or for a set of active cells. The dormancy field may be comprised of a plurality of bits. The SCell dormancy field may be comprised of a plurality of bits. The plurality of bits of the dormancy field may correspond to at least one of a plurality of TCI states or a plurality of CORESET indices. In some aspects, the WUS may comprise an SCell dormancy field, where the SCell dormancy field comprises more than one bit to indicate the active parameters for a set of cells. In some aspects, one or more cells of a PCell may be configured as part of the group of cells. One or more active parameters of the PCell may be identified as dormant based on the WUS. In such instances, at least one parameter of the PCell remains active, such that the PCell comprises at least one active cell.

At 1504, the base station may transmit the WUS outside of the DRX on duration. For example, 1504 may be performed by WUS component 1640 of apparatus 1602. The base station may transmit the WUS outside of the DRX on duration to at least one UE. In some aspects, at least one PDCCH may be transmitted by an active parameter with the group of cells.

At 1506, the base station may transmit an indication indicating a subset of dormant cells. For example, 1506 may be performed by indication component 1642 of apparatus 1602. The base station may transmit the indication indicating the subset of dormant cells to at least one UE. The subset of dormant cells may be within a group of cells or based on the active parameters associated with the TCI state or the CORSET index. In some aspects, the one or more parameters associated with the cell within the group of cells may be associated with different component carriers. The indication indicating the one or more parameters associated with the cell may identify the subset of dormant cells within the group of cells. The subset of dormant cells within the group of cells may be associated with at least one of a component carrier or multiple component carriers.

Figure 16:
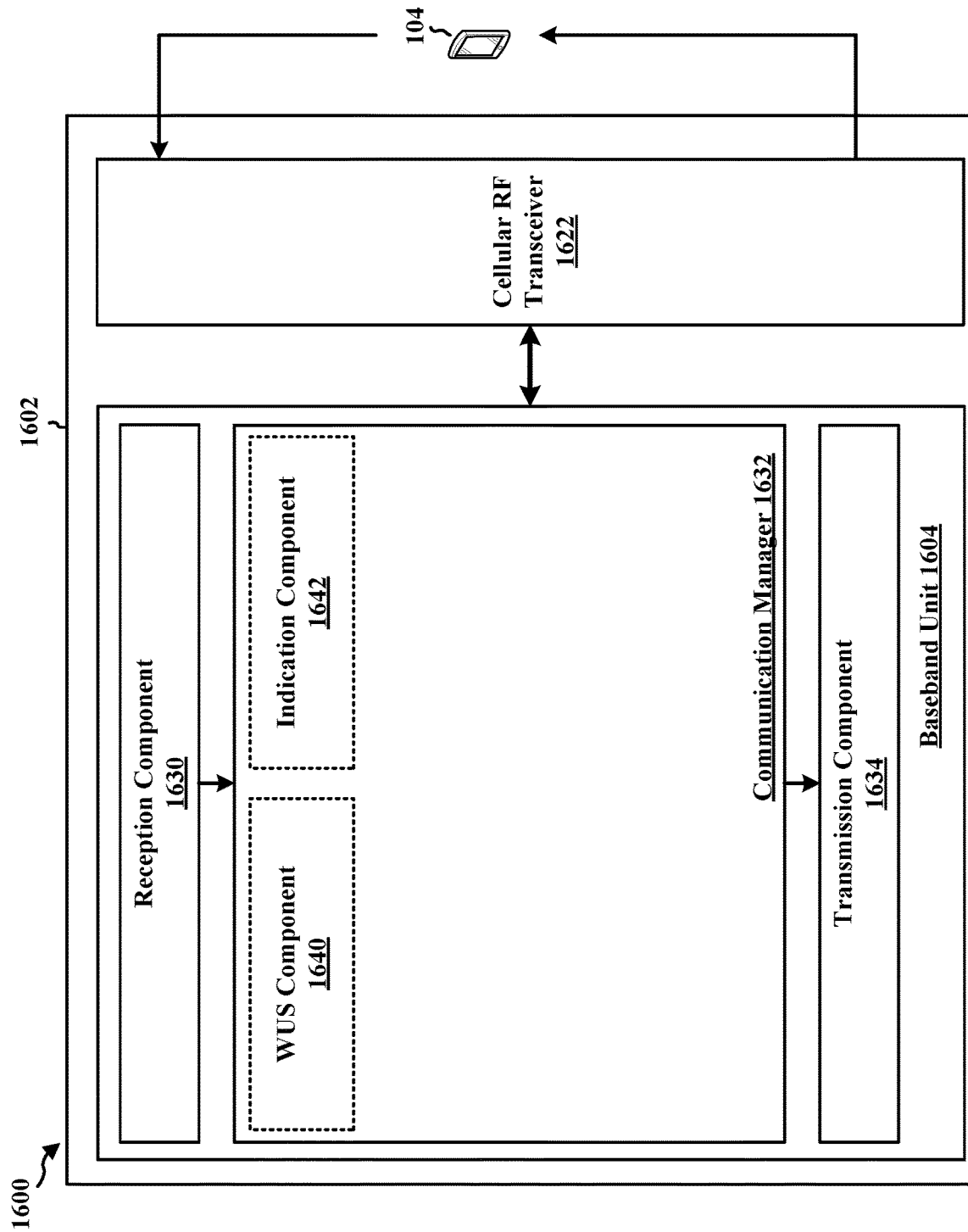
FIG. 16 is a diagram illustrating an example of a hardware implementation for an example apparatus.

FIG. 16 is a diagram 1600 illustrating an example of a hardware implementation for an apparatus 1602. The apparatus 1602 may be a base station, a component of a base station, or may implement base station functionality. In some aspects, the apparatus 1602 may include a baseband unit 1604. The baseband unit 1604 may communicate through a cellular RF transceiver 1622 with the UE 104. The baseband unit 1604 may include a computer-readable medium/memory. The baseband unit 1604 is responsible for general processing, including the execution of software stored on the computer-readable medium/memory. The software, when executed by the baseband unit 1604, causes the baseband unit 1604 to perform the various functions described supra. The computer-readable medium/memory may also be used for storing data that is manipulated by the baseband unit 1604 when executing software. The baseband unit 1604 further includes a reception component 1630, a communication manager 1632, and a transmission component 1634. The communication manager 1632 includes the one or more illustrated components. The components within the communication manager 1632 may be stored in the computer-readable medium/memory and/or configured as hardware within the baseband unit 1604. The baseband unit 1604 may be a component of the base station 310 and may include the memory 376 and/or at least one of the TX processor 316, the RX processor 370, and the controller/processor 375.

The communication manager 1632 includes a WUS component 1640 that may configure a WUS for transmission outside of a DRX on duration, e.g., as described in connection with 1402 of FIG. 14 or 1502 of FIG. 15. The WUS component 1640 may be further configured to transmit the WUS outside of the DRX on duration, e.g., as described in connection with 1404 of FIG. 14 or 1504 of FIG. 15. The communication manager 1632 further includes an indication component 1642 that may transmit an indication indicating a subset of dormant cells, e.g., as described in connection with 1506 of FIG. 15.

The apparatus may include additional components that perform each of the blocks of the algorithm in the flowcharts of FIGS. 14 and 15. As such, each block in the flowcharts of FIGS. 14 and 15 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1602 may include a variety of components configured for various functions. In one configuration, the apparatus 1602, and in particular the baseband unit 1604, includes means for configuring a WUS for transmission outside of a DRX on duration. The WUS comprising an indication indicating one or more parameters associated with a cell within a group of cells to be active during a DRX active time that corresponds to the WUS. The one or more parameters comprising at least one of a TCI state or a CORESET index. The apparatus includes means for transmitting, to at least one UE, the WUS outside of the DRX on duration. The apparatus further includes means for transmitting an indication, to the at least one UE, indicating that the subset of dormant cells are within the group of cells or based on active parameters associated with the TCI state or the CORESET index. The means may be one or more of the components of the apparatus 1602 configured to perform the functions recited by the means. As described supra, the apparatus 1602 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE including at least one processor coupled to a memory and configured to receive a WUS outside of a DRX on duration, the WUS comprising an indication indicating one or more parameters associated with a cell within a group of cells to be active during a DRX active time that corresponds to the WUS, the one or more parameters comprising at least one of a TCI state or a CORESET index; and monitor for at least one PDCCH from at least one active cell during the DRX active time using active parameters according to the WUS.

Aspect 2 is the apparatus of aspect 1, further including a transceiver coupled to the at least one processor.

Aspect 3 is the apparatus of any of aspects 1 and 2, further includes that the one or more parameters comprise the TCI state in a sDCI based mTRP or the CORESET index in mDCI based mTRP.

Aspect 4 is the apparatus of any of aspects 1-3, further includes that the WUS comprises an SCell dormancy field and a dormancy field to indicate the active parameters for each active cell or for a set of active cells.

Aspect 5 is the apparatus of any of aspects 1-4, further includes that the dormancy field is comprised of a plurality of bits and the SCell dormancy field is comprised of a plurality of bits.

Aspect 6 is the apparatus of any of aspects 1-5, further includes that the plurality of bits of the dormancy field correspond to at least one of a plurality of TCI states or a plurality of CORESET indices.

Aspect 7 is the apparatus of any of aspects 1-6, further includes that the WUS comprises an SCell dormancy field, wherein the SCell dormancy field comprises more than one bit to indicate the active parameters for a set of cells.

Aspect 8 is the apparatus of any of aspects 1-7, further includes that the one or more parameters associated with the cell within the group of cells are associated with different component carriers, wherein the indication indicating the one or more parameters associated with the cell identifies a subset of dormant cells within the group of cells.

Aspect 9 is the apparatus of any of aspects 1-8, further includes that the subset of dormant cells within the group of cells are associated with at least one of a component carrier or multiple component carriers.

Aspect 10 is the apparatus of any of aspects 1-9, further includes that the at least one processor is configured to receive an indication indicating that the subset of dormant cells are within the group of cells or based on the active parameters associated with the TCI state or the CORESET index.

Aspect 11 is the apparatus of any of aspects 1-10, further includes that one or more cells of a PCell are configured as part of the group of cells, wherein one or more active parameters of the PCell are identified as dormant based on the WUS.

Aspect 12 is the apparatus of any of aspects 1-11, further includes that at least one parameter of the PCell remains active.

Aspect 13 is the apparatus of any of aspects 1-12, further includes that the at least one PDCCH is monitored with an active parameter with the group of cells.

Aspect 14 is a method of wireless communication for implementing any of aspects 1-13.

Aspect 15 is an apparatus for wireless communication including means for implementing any of aspects 1-13.

Aspect 16 is a computer-readable medium storing computer executable code, where the code when executed by a processor causes the processor to implement any of aspects 1-13.

Aspect 17 is an apparatus for wireless communication at a base station including at least one processor coupled to a memory and configured to configure a WUS for transmission outside of a DRX on duration, the WUS comprising an indication indicating one or more parameters associated with a cell within a group of cells to be active during a DRX active time that corresponds to the WUS, the one or more parameters comprising at least one of a TCI state or a CORESET index; and transmit, to at least one UE, the WUS outside of the DRX on duration.

Aspect 18 is the apparatus of aspect 17, further including a transceiver coupled to the at least one processor.

Aspect 19 is the apparatus of any of aspects 17 and 18, further includes that the one or more parameters comprise the TCI state in a single sDCI based mTRP or the CORESET index in mDCI based mTRP.

Aspect 20 is the apparatus of any of aspects 17-19, further includes that the WUS comprises an SCell dormancy field and a dormancy field to indicate active parameters for each active cell or for a set of active cells.

Aspect 21 is the apparatus of any of aspects 17-20, further includes that the dormancy field is comprised of a plurality of bits and the SCell dormancy field is comprised of a plurality of bits.

Aspect 22 is the apparatus of any of aspects 17-21, further includes that the plurality of bits of the dormancy field correspond to at least one of a plurality of TCI states or a plurality of CORESET indices.

Aspect 23 is the apparatus of any of aspects 17-22, further includes that the WUS comprises an SCell dormancy field, wherein the SCell dormancy field comprises more than one bit to indicate active parameters for a set of cells.

Aspect 24 is the apparatus of any of aspects 17-23, further includes that the one or more parameters associated with the cell within the group of cells are associated with different component carriers, wherein the indication indicating the one or more parameters associated with the cell identifies a subset of dormant cells within the group of cells.

Aspect 25 is the apparatus of any of aspects 17-24, further includes that the subset of dormant cells within the group of cells are associated with at least one of a component carrier or multiple component carriers.

Aspect 26 is the apparatus of any of aspects 17-25, further includes that the at least one processor is configured to transmit an indication, to the at least one UE, indicating that the subset of dormant cells are within the group of cells or based on active parameters associated with the TCI state or the CORESET index.

Aspect 27 is the apparatus of any of aspects 17-26, further includes that one or more cells of a primary cell (PCell) are configured as part of the group of cells, wherein one or more active parameters of the PCell are identified as dormant based on the WUS.

Aspect 28 is the apparatus of any of aspects 17-27, further includes that at least one parameter of the PCell remains active.

Aspect 29 is the apparatus of any of aspects 17-28, further includes that at least one PDCCH is transmitted by an active parameter with the group of cells.

Aspect 30 is a method of wireless communication for implementing any of aspects 17-29.

Aspect 31 is an apparatus for wireless communication including means for implementing any of aspects 17-29.

Aspect 32 is a computer-readable medium storing computer executable code, where the code when executed by a processor causes the processor to implement any of aspects 17-29.

What is claimed is:

1. An apparatus for wireless communication at a user equipment (UE), comprising:
   memory; and
   at least one processor coupled to the memory and configured to:
      receive a wake up signal (WUS) outside of a discontinuous reception (DRX) on duration, the WUS comprising an indication indicating one or more parameters associated with a cell within a group of cells to be active during a DRX active time that corresponds to the WUS, the one or more parameters comprising at least one of a transmission configuration indicator (TCI) state or a control resource set (CORESET) index, wherein the WUS comprises a secondary cell (SCell) dormancy field and a dormancy field to indicate one or more active parameters for each active cell of the group of cells, and wherein the group of cells comprises multiple active cells; and
      monitor for at least one physical downlink control channel (PDCCH) from at least one active cell during the DRX active time using the one or more active parameters according to the WUS.

2. The apparatus of claim 1, further comprising a transceiver coupled to the at least one processor.

3. The apparatus of claim 1, wherein the one or more parameters comprise the TCI state in a single downlink control information (DCI) (sDCI) based multiple transmission reception points (mTRP) or the CORESET index in multi-DCI (mDCI) based mTRP.

4. The apparatus of claim 1, wherein the dormancy field is comprised of a first plurality of bits and the SCell dormancy field is comprised of a second plurality of bits.

5. The apparatus of claim 4, wherein the first plurality of bits of the dormancy field correspond to at least one of a plurality of TCI states or a plurality of CORESET indices.

6. The apparatus of claim 1, wherein the one or more parameters associated with the cell within the group of cells are associated with different component carriers, wherein the indication indicating the one or more parameters associated with the cell identifies a subset of dormant cells within the group of cells.

7. The apparatus of claim 6, wherein the subset of dormant cells within the group of cells are associated with at least one of a component carrier or multiple component carriers.

8. The apparatus of claim 6, wherein the at least one processor is configured to:
   receive an indication indicating that the subset of dormant cells are within the group of cells or based on the one or more active parameters associated with the TCI state or the CORESET index.

9. The apparatus of claim 1, wherein one or more cells of a primary cell (PCell) are configured as part of the group of cells, wherein the one or more active parameters of the PCell are identified as dormant based on the WUS.

10. The apparatus of claim 9, wherein at least one parameter of the PCell remains active.

11. The apparatus of claim 1, wherein the at least one PDCCH is monitored with an active parameter in the one or more active parameters for each active cell of with the group of cells.

12. A method of wireless communication at a user equipment (UE), comprising:
    receiving a wake up signal (WUS) outside of a discontinuous reception (DRX) on duration, the WUS comprising an indication indicating one or more parameters associated with a cell within a group of cells to be active during a DRX active time that corresponds to the WUS, the one or more parameters comprising at least one of a transmission configuration indicator (TCI) state or a control resource set (CORESET) index, wherein the WUS comprises a secondary cell (SCell) dormancy field and a dormancy field to indicate one or more active parameters for each active cell of the group of cells, and wherein the group of cells comprises multiple active cells; and
    monitoring for at least one physical downlink control channel (PDCCH) from at least one active cell during the DRX active time using the one or more active parameters according to the WUS.

13. The method of claim 12, wherein the one or more parameters comprise the TCI state in a single downlink control information (DCI) (sDCI) based multiple transmission reception points (mTRP) or the CORESET index in multi-DCI (mDCI) based mTRP.

14. An apparatus for wireless communication at a network node, comprising:
    memory; and
    at least one processor coupled to the memory and configured to:
       configure a wake up signal (WUS) for transmission outside of a discontinuous reception (DRX) on duration, the WUS comprising an indication indicating one or more parameters associated with a cell within a group of cells to be active during a DRX active time that corresponds to the WUS, the one or more parameters comprising at least one of a transmission configuration indicator (TCI) state or a control resource set (CORESET) index, wherein the WUS comprises a secondary cell (SCell) dormancy field and a dormancy field to indicate one or more active parameters for each active cell of the group of cells, and wherein the group of cells comprises multiple active cells; and
       transmit the WUS outside of the DRX on duration.

15. The apparatus of claim 14, further comprising a transceiver coupled to the at least one processor.

16. The apparatus of claim 14, wherein the one or more parameters comprise the TCI state in a single downlink control information (DCI) (sDCI) based multiple transmission reception points (mTRP) or the CORESET index in multi-DCI (mDCI) based mTRP.

17. The apparatus of claim 14, wherein the dormancy field is comprised of a first plurality of bits and the SCell dormancy field is comprised of a second plurality of bits.

18. The apparatus of claim 17, wherein the first plurality of bits of the dormancy field correspond to at least one of a plurality of TCI states or a plurality of CORESET indices.

19. The apparatus of claim 14, wherein the one or more parameters associated with the cell within the group of cells are associated with different component carriers, wherein the indication indicating the one or more parameters associated with the cell identifies a subset of dormant cells within the group of cells.

20. The apparatus of claim 19, wherein the subset of dormant cells within the group of cells are associated with at least one of a component carrier or multiple component carriers.

21. The apparatus of claim 19, wherein the at least one processor is further configured to:
   transmit an indication indicating that the subset of dormant cells are within the group of cells or based on the one or more active parameters associated with the TCI state or the CORESET index.

22. The apparatus of claim 14, wherein one or more cells of a primary cell (PCell) are configured as part of the group of cells, wherein the one or more active parameters of the PCell are identified as dormant based on the WUS.

23. The apparatus of claim 22, wherein at least one parameter of the PCell remains active.

24. The apparatus of claim 14, wherein at least one PDCCH is transmitted by an active parameter in the one or more active parameters for each active cell of the group of cells.

25. A method of wireless communication at a network node, comprising:
   configuring a wake up signal (WUS) for transmission outside of a discontinuous reception (DRX) on duration, the WUS comprising an indication indicating one or more parameters associated with a cell within a group of cells to be active during a DRX active time that corresponds to the WUS, the one or more parameters comprising at least one of a transmission configuration indicator (TCI) state or a control resource set (CORESET) index, wherein the WUS comprises a secondary cell (SCell) dormancy field and a dormancy field to indicate one or more active parameters for each active cell of the group of cells, and wherein the group of cells comprises multiple active cells; and
   transmitting the WUS outside of the DRX on duration.

* * * * *